(12) United States Patent
Holzer et al.

(10) Patent No.: US 10,068,316 B1
(45) Date of Patent: Sep. 4, 2018

(54) TILTS AS A MEASURE OF USER ENGAGEMENT FOR MULTIVIEW DIGITAL MEDIA REPRESENTATIONS

(71) Applicant: Fyusion, Inc., San Francisco, CA (US)

(72) Inventors: Stefan Johannes Josef Holzer, San Mateo, CA (US); Radu Bogdan Rusu, San Francisco, CA (US); Stephen David Miller, Menlo Park, CA (US); Pantelis Kalogiros, San Francisco, CA (US); George Haber, Los Altos Hills, CA (US)

(73) Assignee: Fyusion, Inc., San Francisco, CA (US)

( * ) Notice: Subject to any disclaimer, the term of this patent is extended or adjusted under 35 U.S.C. 154(b) by 20 days.

(21) Appl. No.: 15/449,527

(22) Filed: Mar. 3, 2017

(51) Int. Cl.
| | |
|---|---|
| *G06T 3/60* | (2006.01) |
| *G06F 3/0485* | (2013.01) |
| *G06F 3/0484* | (2013.01) |
| *G06T 11/00* | (2006.01) |
| *G06T 19/20* | (2011.01) |
| *G06F 3/0481* | (2013.01) |
| *G06T 15/20* | (2011.01) |
| *G06F 3/0487* | (2013.01) |

(52) U.S. Cl.
CPC ............ *G06T 3/60* (2013.01); *G06F 3/0485* (2013.01); *G06F 3/0487* (2013.01); *G06F 3/04815* (2013.01); *G06F 3/04842* (2013.01); *G06T 11/001* (2013.01); *G06T 15/205* (2013.01); *G06T 19/20* (2013.01); *G06T 2219/2016* (2013.01)

(58) Field of Classification Search
CPC combination set(s) only.
See application file for complete search history.

(56) References Cited

U.S. PATENT DOCUMENTS

| | | | |
|---|---|---|---|
| 2014/0324938 A1* | 10/2014 | Gardenfors | H04L 67/10 709/201 |
| 2015/0130799 A1* | 5/2015 | Holzer | G06F 3/04842 345/420 |
| 2015/0205379 A1* | 7/2015 | Mag | G06F 1/1626 345/156 |

* cited by examiner

*Primary Examiner* — Xiao Wu
*Assistant Examiner* — Mohammad H Akhavannik
(74) *Attorney, Agent, or Firm* — Kwan & Olynick LLP

(57) ABSTRACT

Various embodiments of the present invention relate generally to systems and methods for analyzing and manipulating images and video. According to particular embodiments, the spatial relationship between multiple images and video is analyzed together with location information data, for purposes of creating a representation referred to herein as a multi-view interactive digital media representation for presentation on a device. Once a multi-view interactive digital media representation is generated, a user can provide navigational inputs, such via tilting of the device, which alter the presentation state of the multi-view interactive digital media representation. The navigational inputs can be analyzed to determine metrics which indicate a user's interest in the multi-view interactive digital media representation.

23 Claims, 14 Drawing Sheets

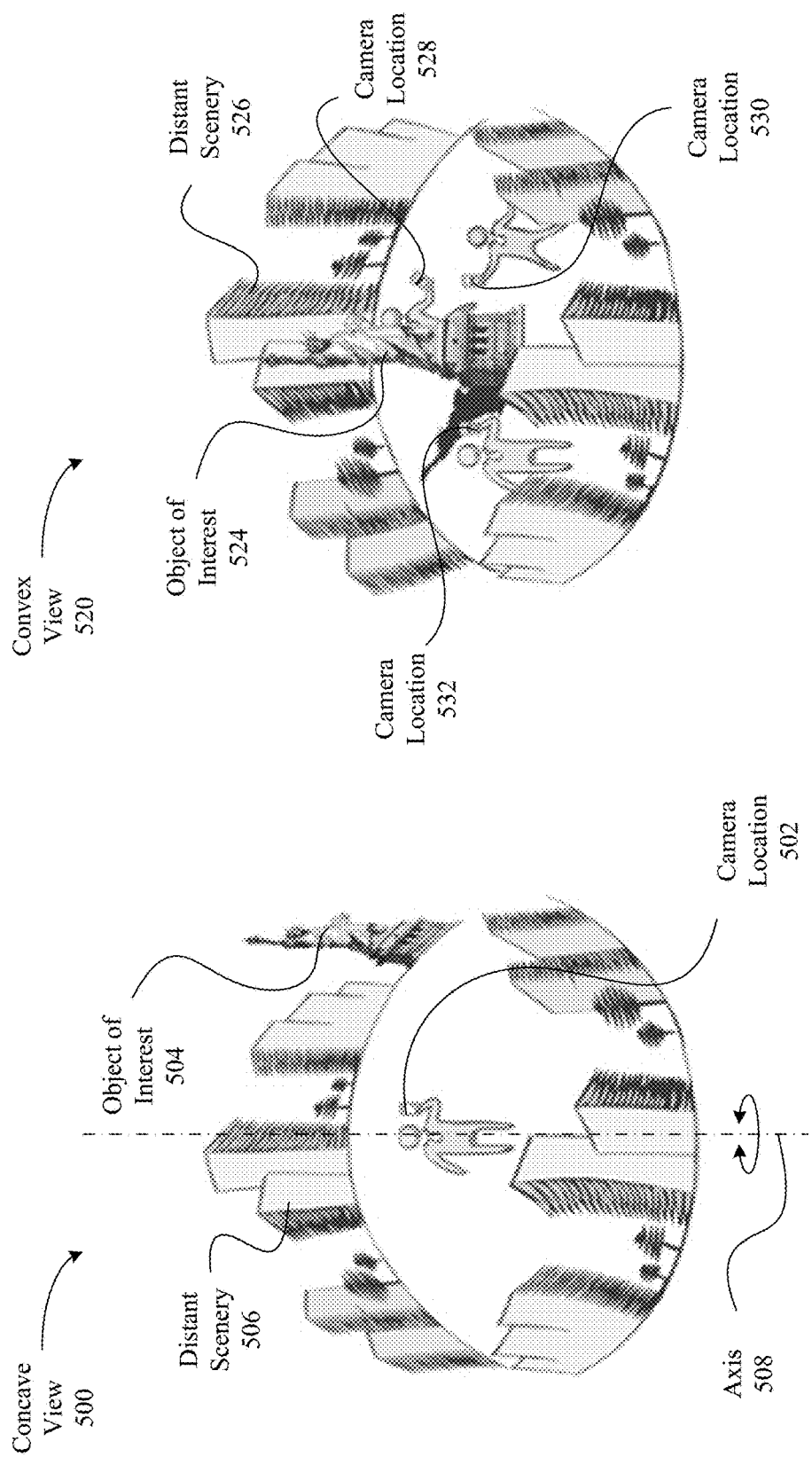

TILTS AS A MEASURE OF USER ENGAGEMENT FOR MULTIVIEW DIGITAL MEDIA REPRESENTATIONS

CROSS-REFERENCE TO RELATED APPLICATIONS

This application related to U.S. patent application Ser. No. 15/409,500, by Holzer et al., filed on Jan. 18, 2017, titled "Visual Search Using Multi-View Interactive Digital Media Presentations," which is incorporated by reference herein in its entirety and for all purposes.

TECHNICAL FIELD

The present disclosure relates to generating and manipulating multi-view interactive digital media representations.

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Current predictions (Ref: KPCB "Internet Trends 2012" presentation") indicate that every several years the quantity of visual data that is being captured digitally online will double. As this quantity of visual data increases, so does the need for much more comprehensive search and indexing mechanisms than ones currently available. Unfortunately, neither 2D images nor 2D videos have been designed for these purposes. Accordingly, improved mechanisms that allow users to view and index visual data, as well as query and quickly receive meaningful results from visual data are desirable.

OVERVIEW

Various embodiments of the present invention relate generally to systems and methods for analyzing and manipulating images and video. According to particular embodiments, the spatial relationship between multiple images and video is analyzed together with location information data, for purposes of creating a representation referred to herein as a multi-view interactive digital media representations. The multi-view interactive digital media representations can be output to a device with a display, such as a mobile device, tablet computer or laptop computer.

Multi-view interactive digital media representations can include images of an object from many different viewing angles. Images with viewing angles about a common axis can be grouped together. These images can be provided in a sequence where the viewing angle changes from image to image in the sequence in an orderly manner. Thus, as the sequence of images is viewed on a display, the object can appear to rotate about the common axis. In particular embodiments, a multi-view interactive digital media representation can be provided with images with viewing angles about one or more axes. Thus, when viewed the object in the multi-view interactive digital media representation can appear to rotate about the one or more axes.

A system can be configured which allows a user to scroll through the sequence of images associated with a multi-view interactive digital media representation. The scrolling can occur in response to navigational inputs received from an input device. In particular embodiments, the navigational inputs can effect a scrolling direction, i.e. towards the end or beginning of an image sequence, how many images are viewed in particular scrolling direction, a scrolling rate and a scrolling axis. For example, a device can include sensors for detecting a tilt of a device. Thus, when a user tilts a device on which a multi-view interactive digital media representation is displayed, the sensor data from the tilt sensor can be used to affect how a multi-view interactive digital media representation is subsequently displayed.

The navigational inputs can be analyzed to determine metrics which indicate a user's interest in the multi-view interactive digital media representation. For example, an inertial measurement unit (IMU) on a mobile device can be used to measure rotations of the device about three axes. The measured rotations of the device about one or more of the three axes can be translated into rotations of a multi-view interactive digital media representation, which is output to a display. A count, referred to as a tilt count, can be derived from the determined rotations of the device. The tilt count can be used as a metric to indicate the user's interest in the multi-view interactive digital media representation and effect how subsequent multi-view interactive digital media representations are displayed.

In one embodiment, a method can be generally characterized as comprising: 1) receiving live images from a camera comprising first 2-D pixel data where a position and/or orientation of the camera varies during capturing of the live images such that an object in the live images is captured from a plurality of camera views; 2) generating from the live images a plurality of images comprising second 2-D pixel data to form a multi-view interactive digital media representation where each of the plurality of images in the multi-view interactive digital media representation includes the object from a different view such that when the plurality of images is output to a display the object appears to undergo a first 3-D movement and where the first 3-D movement is generated without a 3-D polygon model of the object; 3) outputting an initial state of the multi-view interactive digital media representation to the display; 4) receiving navigational inputs from an input source; 5) based upon the navigational inputs, determining a first portion of the plurality of images to output to the display where, when the first portion of the plurality of images is output to the display, the object appears to undergo a first portion of the first 3-D movement; and 6) based upon the navigational inputs and/or the first portion of the plurality images determining whether to increment a count. In a particular embodiment, the camera and display are coupled to a mobile device including a processor and a memory. The multi-view interactive digital media representation is generated from the live images using the processor and memory on the mobile device. The input source for the navigational inputs is an inertial measurement unit coupled to the mobile device.

Another embodiment can be generally characterized as a method comprising 1) outputting to a display a first 2-D image rendered from a 3-D model of a 3-D object in a 3-D model space where points defining the 3-D model can be at first 3-D locations in the 3-D model space, when the first 2-D image is rendered; 2) after the first 2-D image is output to the display, receiving a sequence of navigational inputs from at least one input source where the sequence of navigational inputs can begin with a first navigational input; 3) selecting a second navigational input from among the sequence of navigational inputs; 4) based upon at least the second navigational input, determining second 3-D locations of the points defining the 3-D model in the 3-D model space; 5) based upon the second 3-D locations, outputting to the display a second 2-D image rendered from the 3-D model in the 3-D model space; and 6) based upon one of i) a first change between the first navigational input and the second navigational input, ii) a second change between the first 3-D locations and the second 3-D locations or iii) combinations thereof, determining whether to increment a count.

BRIEF DESCRIPTION OF THE DRAWINGS

The disclosure may best be understood by reference to the following description taken in conjunction with the accompanying drawings, which illustrate particular embodiments of the present invention.

FIGS. 5A-5B illustrate examples of concave view and convex views, respectively, where both views use a back-camera capture style in accordance with embodiments of the present invention.

DETAILED DESCRIPTION

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a multi-view interactive digital media representation, which eliminates redundancy in the data, and presents a user with an interactive and immersive active viewing experience. According to various embodiments, active is described in the context of providing a user with the ability to control the viewpoint of the visual information displayed on a screen.

In particular embodiments, a system can be configured to output multi-view interactive digital media representations in response to user navigational inputs. The navigational inputs can be analyzed to determine metrics which indicate a user's interest in the multi-view interactive digital media representation. For example, an inertial measurement unit (IMU) on a mobile device can be used to measure rotations of the device about three axes. The measured rotations of the device can be used to determine rotations of a multi-view interactive digital media representation. A count, referred to as a tilt count, can be derived from the measured rotations of the device. The tilt count can be used as a metric to indicate the user's interest in the multi-view interactive digital media representation and affect how subsequent multi-view interactive digital media representations are displayed.

Figure 1:
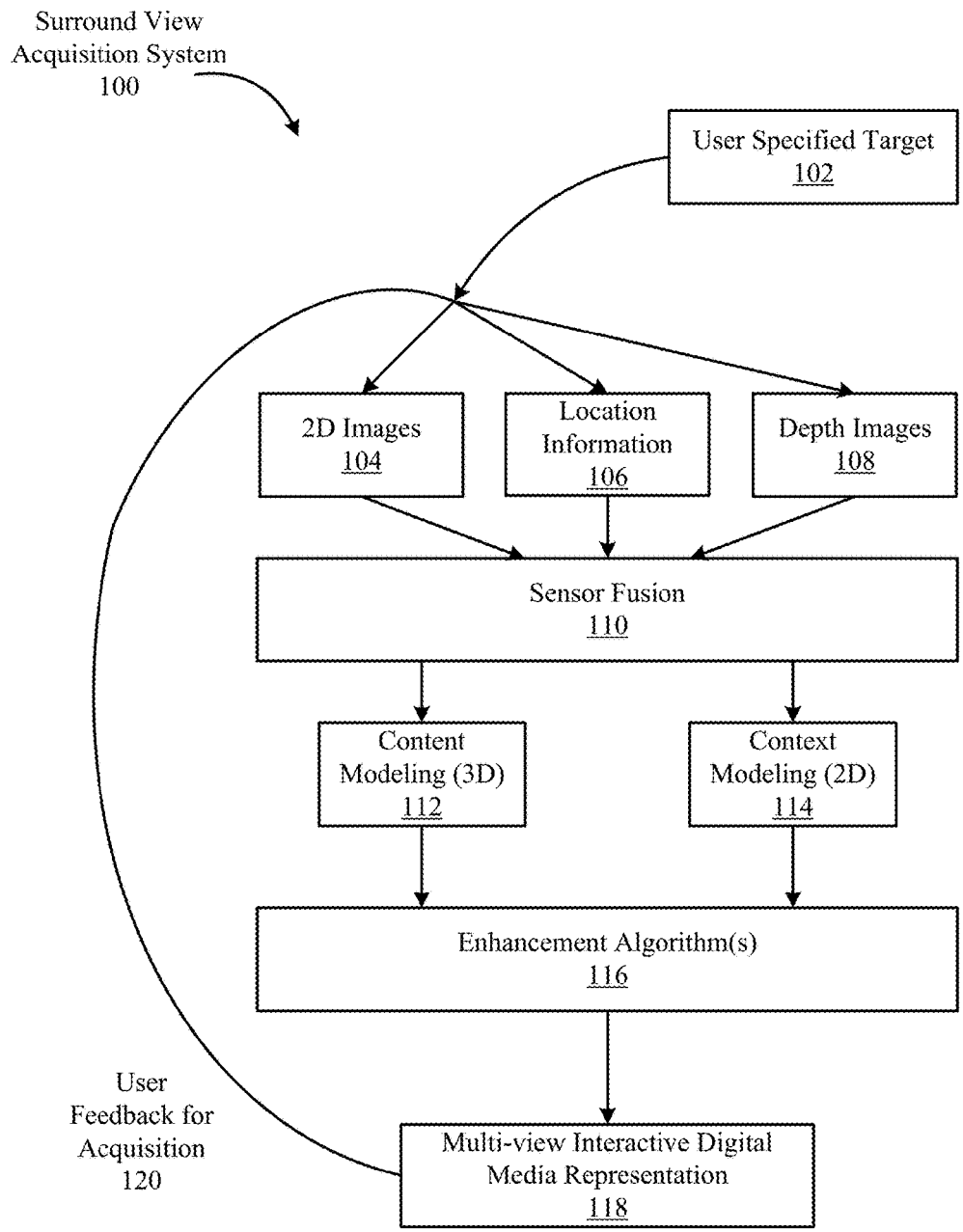
FIG. 1 illustrates an example of a multi-view interactive digital media representation acquisition system in accordance with embodiments of the present invention.

According to various embodiments of the present invention, a multi-view interactive digital media representation is a multi-view interactive digital media representation. With reference to FIG. 1, shown is one example of a multi-view interactive digital media representation acquisition system 100. In the present example embodiment, the multi-view interactive digital media representation acquisition system 100 is depicted in a flow sequence that can be used to generate a multi-view interactive digital media representation. According to various embodiments, the data used to generate a multi-view interactive digital media representation can come from a variety of sources.

In particular, data such as, but not limited to two-dimensional (2D) images 104 can be used to generate a multi-view interactive digital media representation. These 2D images can include color image data streams such as multiple image sequences, video data, etc., or multiple images in any of various formats for images, depending on the application. As will be described in more detail below with respect to FIGS. 7-12, after a multi-view interactive digital media representation is generated, it can be output to a display in accordance with navigational inputs provided by a user. The navigational inputs can be analyzed to derive metrics which indicate a user's interest in a particular multi-view interactive digital media representation. The metrics can be used to affect the manner in which multi-view interactive digital media representations are output.

Another source of data that can be used to generate a multi-view interactive digital media representation includes environment information 106. This environment information 106 can be obtained from sources such as accelerometers, gyroscopes, magnetometers, GPS, WiFi, IMU-like systems (Inertial Measurement Unit systems), and the like. Yet another source of data that can be used to generate a multi-view interactive digital media representation can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a multi-view interactive digital media representation can be generated a combination of data that includes both 2D images 104 and environment information 106, without any depth images 108 provided. In other embodiments, depth images 108 and environment information 106 can be used together at sensor fusion block 110. Various combinations of image data can be used with environment information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a multi-view interactive digital media representation are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a multi-view interactive digital media representation can be generated without a user specified target in some applications.

In the present example embodiment, one or more enhancement algorithms can be applied at enhancement algorithm(s) block 116. In particular example embodiments, various algorithms can be employed during capture of multi-view interactive digital media representation data, regardless of the type of capture mode employed. These algorithms can be used to enhance the user experience. For instance, automatic frame selection, stabilization, view interpolation, filters, and/or compression can be used during capture of multi-view interactive digital media representation data. In some examples, these enhancement algorithms can be applied to image data after acquisition of the data. In other examples, these enhancement algorithms can be applied to image data during capture of multi-view interactive digital media representation data.

According to particular example embodiments, automatic frame selection can be used to create a more enjoyable multi-view interactive digital media representation. Specifically, frames are automatically selected so that the transition between them will be smoother or more even. This automatic frame selection can incorporate blur- and overexposure-detection in some applications, as well as more uniformly sampling poses such that they are more evenly distributed.

In some example embodiments, stabilization can be used for a multi-view interactive digital media representation in a manner similar to that used for video. In particular, key frames in a multi-view interactive digital media representation can be stabilized for to produce improvements such as smoother transitions, improved/enhanced focus on the content, etc. However, unlike video, there are many additional sources of stabilization for a multi-view interactive digital media representation, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a multi-view interactive digital media representation. Because points of interest in a multi-view interactive digital media representation are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for multi-view interactive digital media representations. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a multi-view interactive digital media representation is often focused on a particular object of interest, a multi-view interactive digital media representation can be content-weighted so that the object of interest is maximally stabilized in some examples.

Another way to improve stabilization in a multi-view interactive digital media representation includes direct selection of a region of a screen. For instance, if a user taps to focus on a region of a screen, then records a convex multi-view interactive digital media representation, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various examples, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a multi-view interactive digital media representation in some embodiments. In other embodiments, view interpolation can be applied during multi-view interactive digital media representation generation.

In some examples, filters can also be used during capture or generation of a multi-view interactive digital media representation to enhance the viewing experience. Just as many popular photo sharing services provide aesthetic filters that can be applied to static, two-dimensional images, aesthetic filters can similarly be applied to surround images. However, because a multi-view interactive digital media representation is more expressive than a two-dimensional image, and three-dimensional information is available in a multi-view interactive digital media representation, these filters can be extended to include effects that are ill-defined in two dimensional photos. For instance, in a multi-view interactive digital media representation, motion blur can be added to the background (i.e. context) while the content remains crisp. In another example, a drop-shadow can be added to the object of interest in a multi-view interactive digital media representation.

In various examples, compression can also be used as an enhancement algorithm 116. In particular, compression can be used to enhance user-experience by reducing data upload and download costs. Because multi-view interactive digital media representations use spatial information, far less data can be sent for a multi-view interactive digital media representation than a typical video, while maintaining desired qualities of the multi-view interactive digital media representation. Specifically, the IMU, keypoint tracks, and user input, combined with the view interpolation described above, can all reduce the amount of data that must be transferred to and from a device during upload or download of a multi-view interactive digital media representation. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a multi-view interactive digital media representation 118 is generated after any enhancement algorithms are applied. The multi-view interactive digital media representation can provide a multi-view interactive digital media representation. In various examples, the multi-view interactive digital media representation can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, multi-view interactive digital media representations provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with multi-view interactive digital media representations that allow the multi-view interactive digital media representations to be indexed with a high degree of efficiency and accuracy; and the ability of the user to interact and change the viewpoint of the multi-view interactive digital media representation. In particular example embodiments, the characteristics described above can be incorporated natively in the multi-view interactive digital media representation, and provide the capability for use in various applications. For instance, multi-view interactive digital media representations can be used to enhance various fields such as e-commerce, visual search, 3D printing, file sharing, user interaction, and entertainment.

According to various example embodiments, once a multi-view interactive digital media representation 118 is generated, user feedback for acquisition 120 of additional image data can be provided. In particular, if a multi-view interactive digital media representation is determined to need additional views to provide a more accurate model of the content or context, a user may be prompted to provide additional views. Once these additional views are received by the multi-view interactive digital media representation acquisition system 100, these additional views can be processed by the system 100 and incorporated into the multi-view interactive digital media representation.

Figure 2:
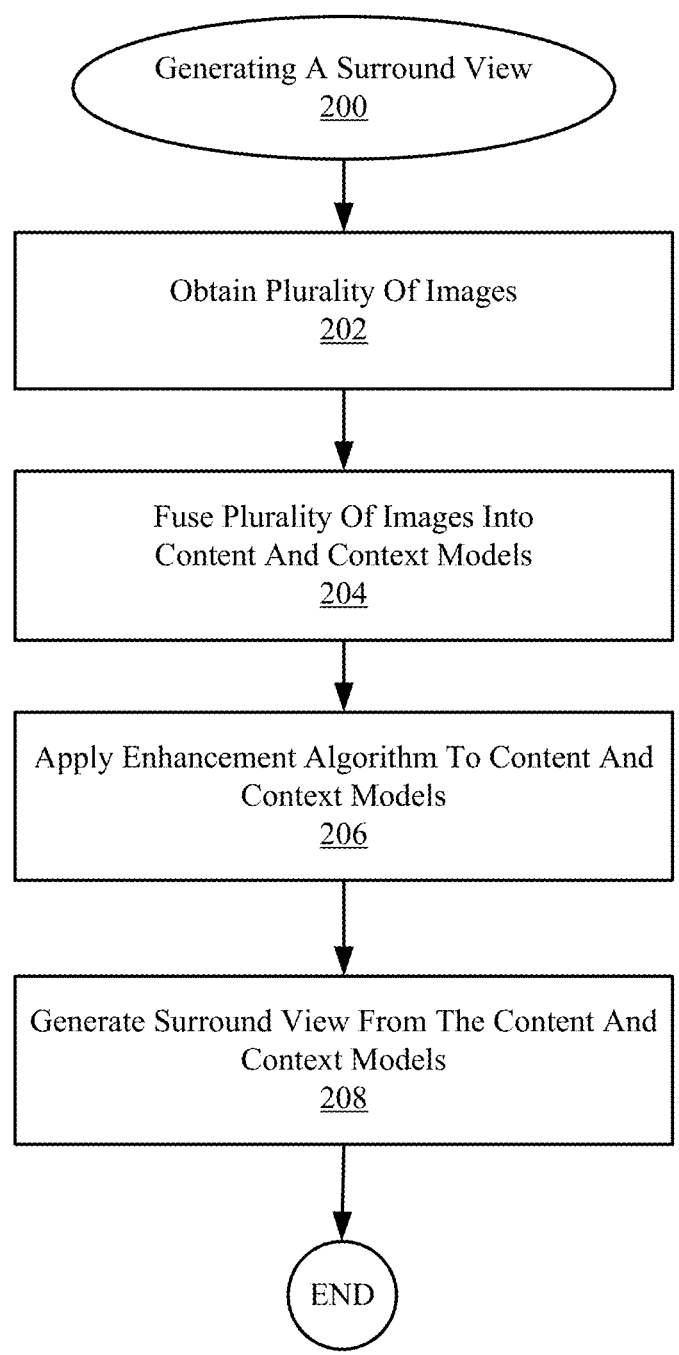
FIG. 2 illustrates an example of a process flow for generating a multi-view interactive digital media representation in accordance with embodiments of the present invention.

With reference to FIG. 2, shown is an example of a process flow diagram for generating a multi-view interactive digital media representation 200. In the present example, a plurality of images is obtained at 202. According to various embodiments, the plurality of images can include two-dimensional (2D) images or data streams. These 2D images can include location information that can be used to generate a multi-view interactive digital media representation. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a multi-view interactive digital media representation is generated from the content and context models at 208. The multi-view interactive digital media representation can provide a multi-view interactive digital media representation. In various examples, the multi-view interactive digital media representation can include a three-dimensional model of the content and a two-dimensional model of the context. According to various embodiments, depending on the mode of capture and the viewpoints of the images, the multi-view interactive digital media representation model can include certain characteristics. For instance, some examples of different styles of multi-view interactive digital media representations include a locally concave multi-view interactive digital media representation, a locally convex multi-view interactive digital media representation, and a locally flat multi-view interactive digital media representation. However, it should be noted that multi-view interactive digital media representations can include combinations of views and characteristics, depending on the application.

Figure 3:
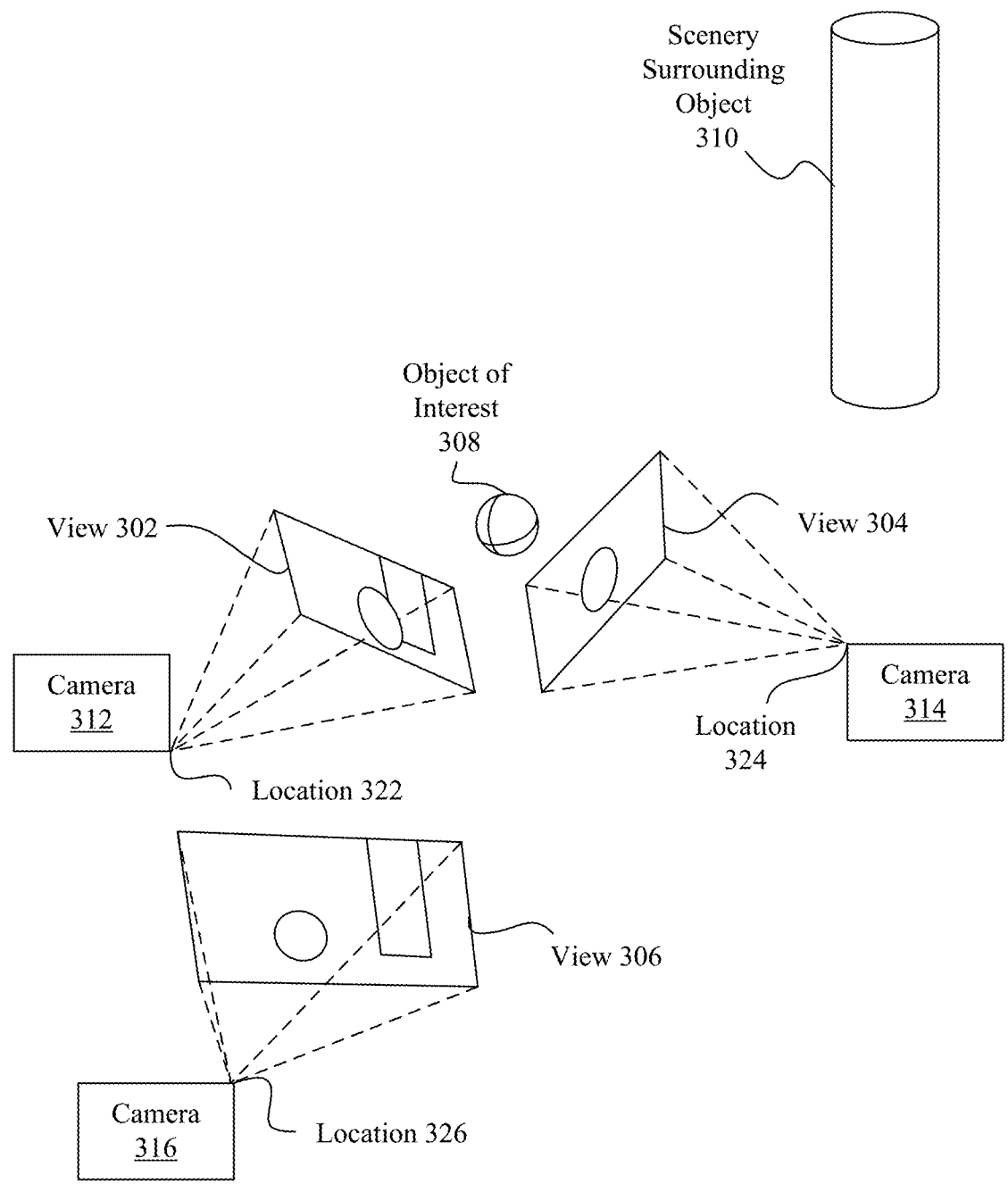
FIG. 3 illustrates one example of multiple camera views that can be fused into a three-dimensional (3D) model to create an immersive experience in accordance with embodiments of the present invention.

With reference to FIG. 3, shown is one example of multiple camera views that can be fused together into a three-dimensional (3D) model to create an immersive experience. According to various embodiments, multiple images can be captured from various viewpoints and fused together to provide a multi-view interactive digital media representation. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 316 along with their associated locations 322, 324, and 326, respectively, provide a rich source of information about object of interest 308 and the surrounding context that can be used to produce a multi-view interactive digital media representation. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a multi-view interactive digital media representation.

Figure 4:
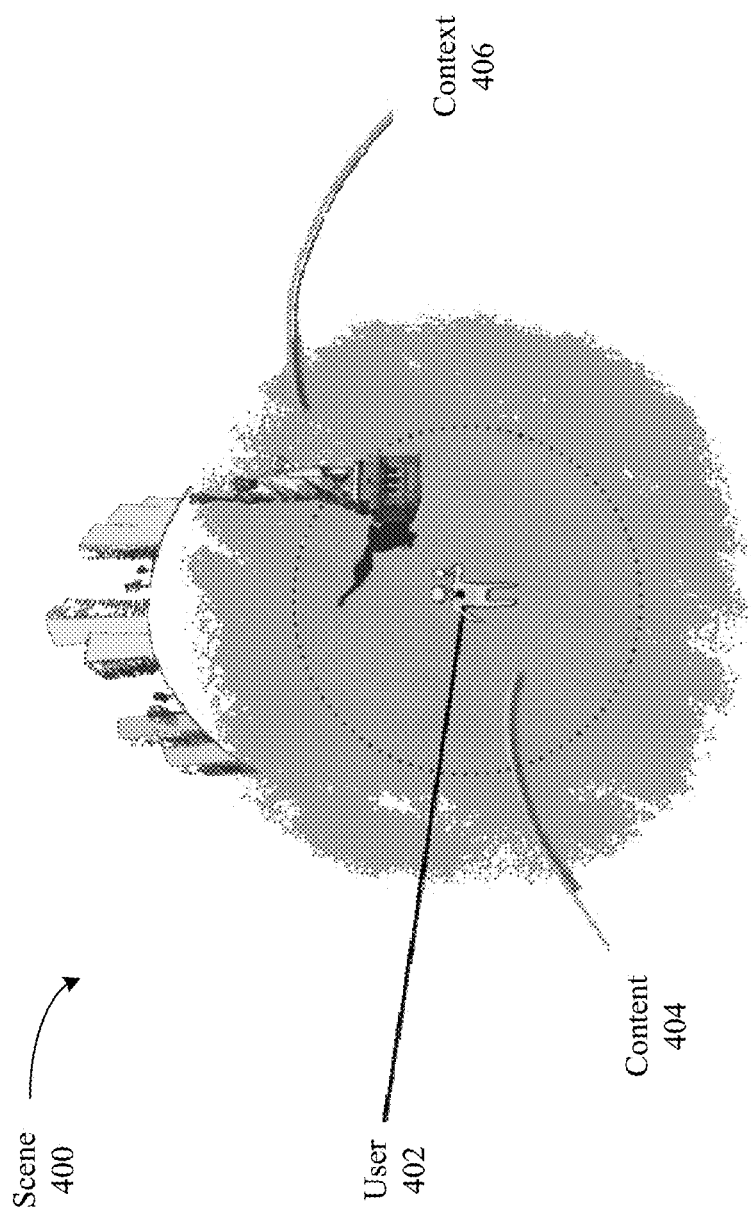
FIG. 4 illustrates one example of separation of content and context in a multi-view interactive digital media representation in accordance with embodiments of the present invention.

FIG. 4 illustrates one example of separation of content and context in a multi-view interactive digital media representation. According to various embodiments of the present invention, a multi-view interactive digital media representation is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a multi-view interactive digital media representation.

According to various embodiments of the present disclosure, the digital visual data included in a multi-view interactive digital media representation can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a multi-view interactive digital media representation may represent the content 404 as three-dimensional data, and the context 406 as a two-dimensional panoramic background. In other examples, a multi-view interactive digital media representation may represent both the content 404 and context 406 as two-dimensional panoramic scenes. In yet other examples, content 404 and context 406 may include three-dimensional components or aspects. In particular embodiments, the way that the multi-view interactive digital media representation depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the multi-view interactive digital media representation produced may have some characteristics that are similar to other types of digital media such as panoramas. However, according to various embodiments, multi-view interactive digital media representations include additional features that distinguish them from these existing types of digital media. For instance, a multi-view interactive digital media representation can represent moving data. Additionally, a multi-view interactive digital media representation is not limited to a specific cylindrical, spherical or translational movement. Various motions can be used to capture image data with a camera or other capture device. Furthermore, unlike a stitched panorama, a multi-view interactive digital media representation can display different sides of the same object.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a multi-view interactive digital media representation.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A-6D illustrate examples of various capture modes for multi-view interactive digital media representations. Although various motions can be used to capture a multi-view interactive digital media representation and are not constrained to any particular type of motion, three general types of motion can be used to capture particular features or views described in conjunction multi-view interactive digital media representations. These three types of motion, respectively, can yield a locally concave multi-view interactive digital media representation, a locally convex multi-view interactive digital media representation, and a locally flat multi-view interactive digital media representation. In some examples, a multi-view interactive digital media representation can include various types of motions within the same multi-view interactive digital media representation.

Figure 6A:
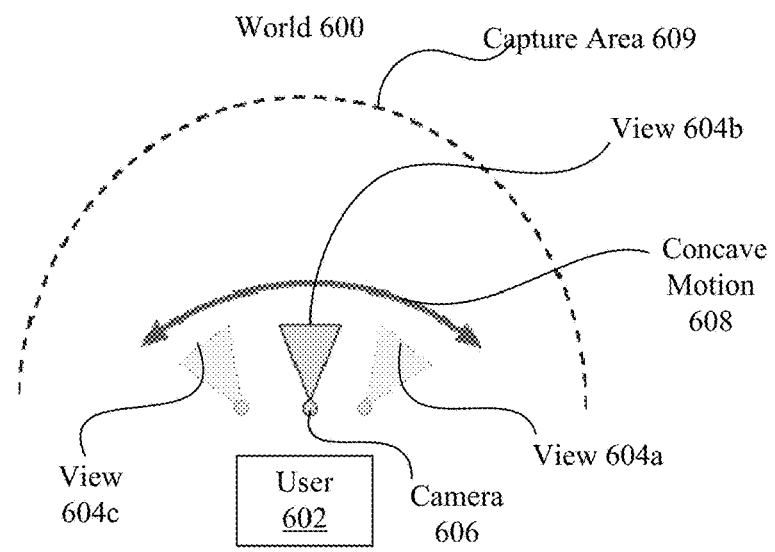
FIGS. 6A-6D illustrate examples of various capture modes for multi-view interactive digital media representations in accordance with embodiments of the present invention.

With reference to FIG. 6A, shown is an example of a back-facing, concave multi-view interactive digital media representation being captured. According to various embodiments, a locally concave multi-view interactive digital media representation is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
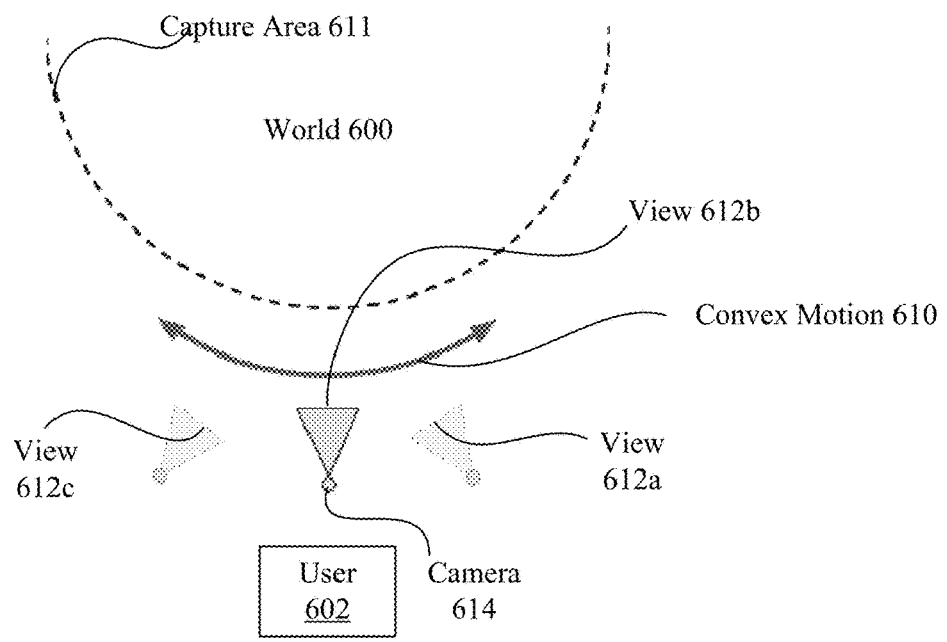

With reference to FIG. 6B, shown is an example of a back-facing, convex multi-view interactive digital media representation being captured. According to various embodiments, a locally convex multi-view interactive digital media representation is one in which viewing angles converge toward a single object of interest. In some examples, a locally convex multi-view interactive digital media representation can provide the experience of orbiting about a point, such that a viewer can see multiple sides of the same object. This object, which may be an "object of interest," can be segmented from the multi-view interactive digital media representation to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
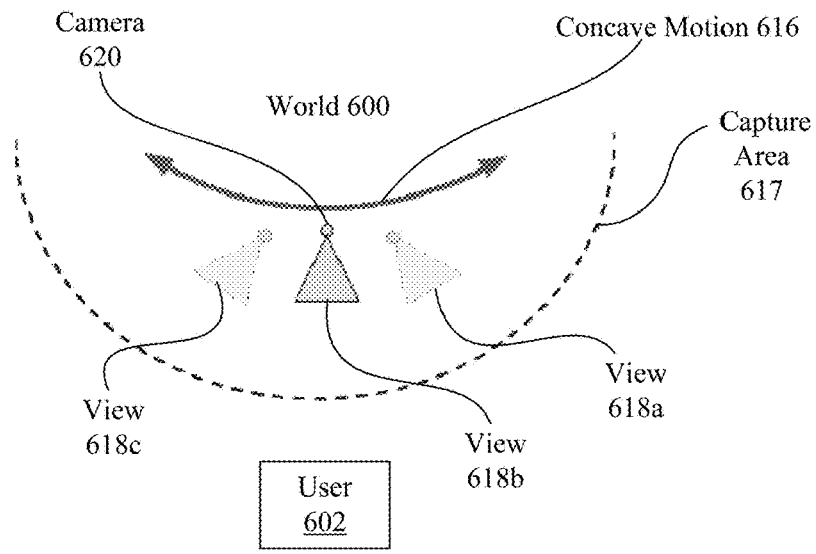

With reference to FIG. 6C, shown is an example of a front-facing, concave multi-view interactive digital media representation being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 606 such that the views 618a, 618b, and 618c diverge from each other in an angular sense. The capture area 617 follows a concave shape that includes the user at a perimeter.

Figure 6D:
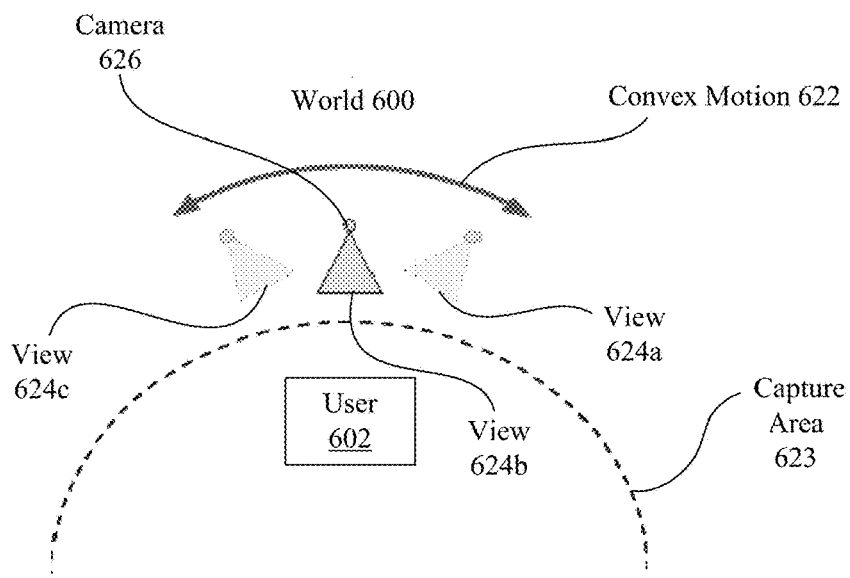

With reference to FIG. 6D, shown is an example of a front-facing, convex multi-view interactive digital media representation being captured. In the present example embodiment, camera 626 is facing user 602. The camera follows a convex motion 622 such that the views 624a, 624b, and 624c converge towards the user 602. As described above, various modes can be used to capture images for a multi-view interactive digital media representation. These modes, including locally concave, locally convex, and locally linear motions, can be used during capture of separate images or during continuous recording of a scene. Such recording can capture a series of images during a single session.

Next, with respect to FIGS. 7 to 12, system and methods for manipulating multi-view interactive digital media representations are described. In particular embodiments, the system can output a multi-view interactive digital media representation to a display. Then, the system can receive navigational inputs which affect the presentation of the multi-view interactive digital media representation, such as inputs which cause the images in the multi-view interactive digital media representation to appear to rotate. Based upon the navigational inputs, the system can be configured to determine metrics which are indicative of a user's interest in the multi-view interactive digital media representation. One such metric, which will be described in more detail with respect to the following figures, can be referred to as a tilt count.

When a multi-view interactive digital media representation is presented, a sequence of images can be output to a display. In various embodiments, each image in the sequence of images can be selected from among previously generated images, can be generated using image components which have been previously generated and image component which are rendered on the fly, such as images rendered from 3-D models or can be totally rendered on fly, such as rendered from 3-D and/or 2-D models. With respect to FIGS. 7 to 11, embodiments are described where the sequence of images associated with the presentation of the multi-view interactive digital media representation are selected from among previously generated images. As described with respect to FIG. 12, other approaches can be used to generate the sequence of images used in the presentation of the multi-view interactive digital media representation. Hence, the embodiments described with respect to FIGS. 7-11 are for the purposes of illustration only and are not meant to be limiting.

Figure 7:
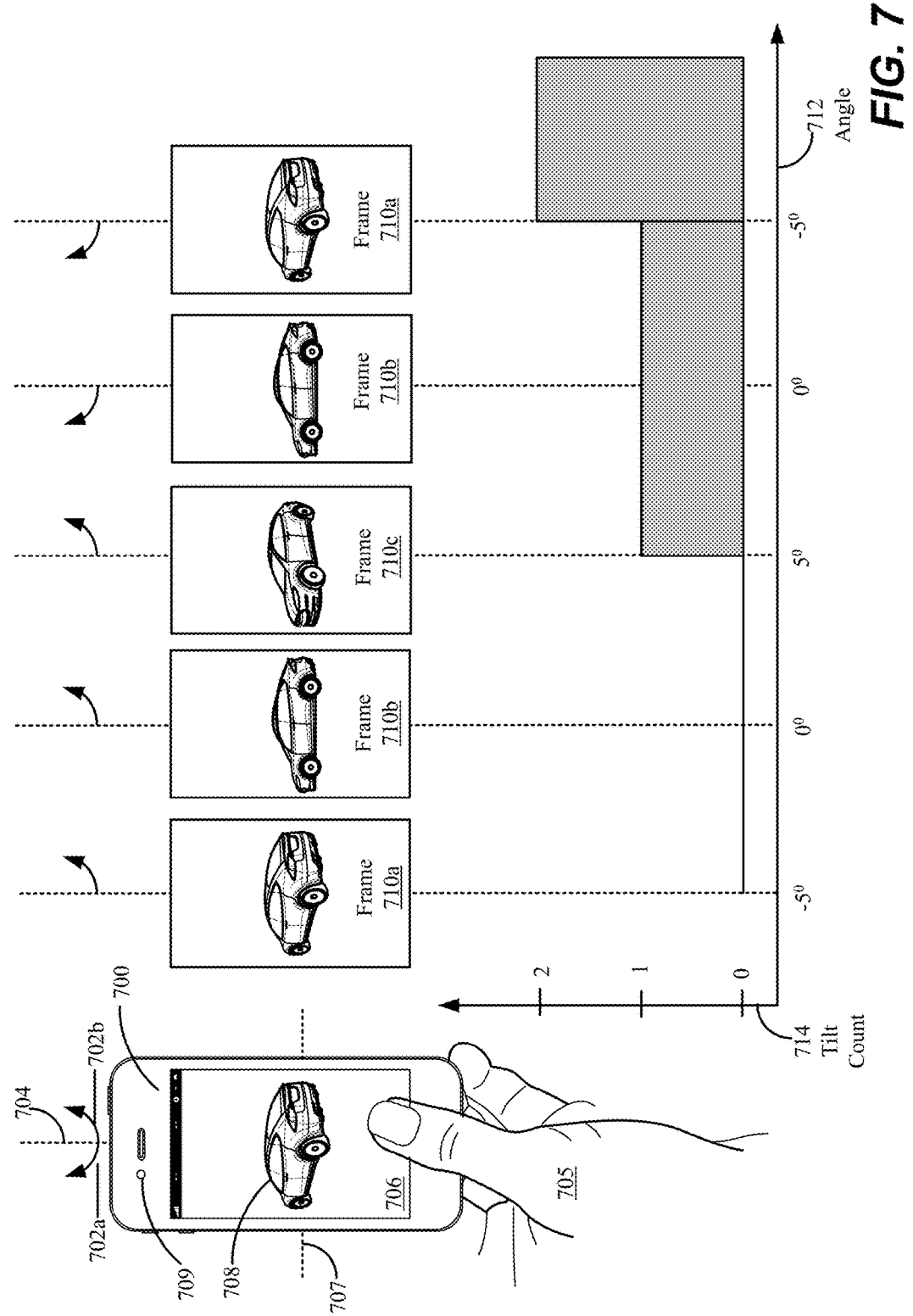
FIG. 7 illustrates an example of generating a tilt count for a multi-view interactive digital media representation in accordance with embodiments of the present invention.

FIG. 7 illustrates an example of generating a tilt count for a multi-view interactive digital media representation. In FIG. 7, a mobile device 700 includes a display 706. A multi-view interactive digital media representation 708 which includes images of a car is shown on display 706. The mobile device 700, which is embodied as a phone, is shown being held in the hand 705 of a user. The user can use the mobile device 700 to provide inputs which change a state of a multi-view interactive digital media representation.

In one embodiment, the mobile device 700 can include sensors for measuring a tilt orientation of the device. For example, the mobile device 700 can include an inertial measurement unit (IMU). The inertial measurement unit can measure accelerations, angular rates and sometimes a magnetic field around a body using accelerometers, gyroscopes and magnetometers. The sensor data from the IMU can be used to determine an orientation of the mobile device.

As an example, sensor data from an Iphone™ can be used to provide 1) Euler angles of the device, 2) an attitude quaternion, 3) a rotation matrix, 4) the gravitational component of 3-D acceleration, 5) a user acceleration component of 3-D acceleration and 6) rotation rates. The Euler angles can be the pitch, roll and yaw of the device in radians, which represents the device attitude. The attitude quaternion is a four dimensional vector. It can also be used to determine the pitch, roll and yaw of the device.

Further, the 3-D axis of the Iphone™ can be reported. Typically, the z-direction is perpendicular to the display and is aligned with the direction of the camera, the y direction points to a top of the phone and the x direction points to the side of the phone. The 3-D acceleration can be expressed in the device reference frame.

The rotation matrix can provide the camera rotation in the IMU reference frame or some specified reference frame. The attitude rotation matrix is a 3×3 matrix. The IMU reference frame can align the z direction of the IMU reference frame with the direction of gravity.

Returning to FIG. 7, the multi-view interactive digital media representation 708 can be associated with the three frames, 710a, 710b and 710c. In one embodiment, the frames are associated with rotation angles where the object appears to be rotated through some angle in physical space. In this example, frame 710a is associated with negative five degrees, frame 710b is associated with zero degrees and frame 710c is associated with positive five degrees. In particular embodiments, the angle spacing doesn't have to be equal from frame to frame. For example, the angle spacing between frame 710a and 710b can be three degrees and the angle spacing between frame 710b and 710c can be eight degrees.

In yet other embodiments, a rotation angle, or other physical quantity, doesn't have to be associated with each of the frames of the multi-view interactive digital media representation. For example, the user can provide navigational inputs which cause the multi-view interactive digital media representation to move forward or backwards in the sequence. The frames can be indexed as part of a sequence. Thus, the index of frames where the user provides a navigational input to change a direction of scrolling through the sequence can be noted.

To navigate through the multi-view interactive digital media representation, the user can rotate the device 700, such as about axis 704 in the clockwise 702a or counter clockwise 702b directions. Initially, frame 710a can be output. A rotational motion about axis 704 in the counter clockwise direction can cause frames 710b and 710c of the multi-view interactive digital media representation to be displayed. Next, the user can reverse the rotation direction of mobile device 700 about axis 704 to the clockwise direction and frames 710b and 710a can be displayed. On the display, the car in the multi-view interactive digital media representation 708 can appear to be rotating in the counter clockwise and clockwise direction in accordance with the rotation of device 700.

In particular embodiments, the rate at which the mobile device 700 is tilted can affect the rate at which images in the multi-view interactive digital media representation are displayed. Thus, the car in multi-view interactive digital media representation 708 can appear to rotate faster or slower depending on how fast the device 700 is rotated. As described above, rotation rates can be obtained from a sensor package on the mobile device. For example, an IMU on a mobile device can include accelerometers and gyroscopes, which allow rotation rates to be measured.

The navigational inputs provided from tilting the mobile device can be converted to a "tilt" count. In one embodiment, a threshold amount of rotation of the mobile device in physical space can be used to increment a tilt count. When the user physically rotates the mobile device less than the threshold amount and then pauses, the tilt count is not incremented. When the user physically rotates the mobile device more than the threshold amount without a pause, then the tilt count is incremented.

As an example, the tilt count 714 can start at zero. Then, from frame 710a to frame 710c, the user may tilt the mobile device 700 more than the threshold amount and then the tilt count can be incremented by one for total tilt count of one, as shown in FIG. 7. Then, the between frame 710c and 710a, as the multi-view interactive digital media representation 708 is rotated in the opposite direction, the user may tilt the mobile device 700 more than the threshold amount and the tilt count can again be incremented by one. Thus, the total tilt count can be incremented from one to two.

In another embodiment, the tilt count can be based upon motions of the multi-view interactive digital media representation derived from the physical tilting of the mobile device. As shown in FIG. 7, the user can physically rotate the mobile device 700 some amount. The physical rotation can be converted into a series of frames in the multi-view interactive digital media representation to display. The object in each frame can each be associated with an angle amount 712. Thus, based upon the sequence of frames which are output, the rotation amount of the object in the multi-view interactive digital media representation 708 can be determined.

As an example, the physical rotation of the mobile device 700 can cause the car in the multi-view interactive digital media representation 708 to rotate through an angle 712 of ten degrees in the multi-view interactive digital media representation space (Each frame can be associated with angle in the multi-view interactive digital media representation space). The ten degrees in the multi-view interactive digital media representation space can be greater than the threshold rotation amount. Thus, the tilt count 714 can be incremented by one. Then, the physical rotation of the mobile device 700 in the opposite direction can be translated into a rotation of the multi-view interactive digital media representation 708 through ten degrees of angle 712 in the opposite direction. Thus, the tilt count 714 can be again incremented by one for a total of two. Thus, the total rotation amount in the two directions is twenty degrees.

In yet other embodiments, a multi-view interactive digital media representation, such as 708, can include a sequence of images. The navigational input, such as the rotation of device 700, can be translated into some amount of images in the sequence being traversed. For example, a multi-view interactive digital media representation 708 can include one hundred images and a physical rotation of the mobile device 700 can cause ten of the one hundred images to be displayed, i.e., ten percent of the sequence. A threshold amount can be eight percent of the sequence or eight images in a particular direction, i.e., forward or backward through the sequence. Hence, as a result of this movement, the tilt count can be incremented by one.

In various embodiments, a multi-view interactive digital media representation, such as 708, can include images with objects. When the multi-view interactive digital media representation is output, the objects can appear to have an apparent motion, such as an ability to rotate about one or more axes. For example, multi-view interactive digital media representation 708 can include images that when output make the car appear to rotate about axes 704 or axes 707. The apparent rotation is accomplished using 2-D images only and doesn't require a 3-D model of the object, such as 3-D model including a plurality of polygons and associated textures. Hence, the operations can be performed in more computationally efficient manner, as a textured 3-D model of the object doesn't have to be generated, the position of the 3-D model of the object in the 3-D space for each rotation doesn't have to be determined and, after the 3-D model of the object is positioned in the 3-D space, it doesn't have to be textured and then rendered to a 2-D image for output to a display. The elimination of these steps with a multi-view interactive digital media representation approach reduces memory requirements and CPU requirements.

In addition, when an apparent motion of an object is output from a multi-view interactive digital media representation, it appears as if the object motion is generated from an image quality 3-D textured model. Image quality 3-D textured models are generated in a time consuming and often manual process. In particular, the generation of an image quality textured 3-D model of an object, such as an actual person, is quite difficult and time consuming, especially, when a "life like" rendering of the object is desired.

In the multi-view interactive digital media representation approach, because of the elimination of the 3-D modeling steps, user-selected objects from user generated 2-D images can be converted quickly to a multi-view interactive digital media representation and then output to a display in real-time. During output, the user can control aspects of apparent motion of the object within the multi-view interactive digital media representation. Because the object in the multi-view interactive digital media representation can be generated from real images, such as images received from a user-controlled camera, the object appears life-like when output. In a traditional 3-D modeling approach, because of the difficulties associated with generating an image quality 3-D model, this capability is not offered.

Returning to FIG. 7, in one instance, rotations of the mobile device 700 about axis 704 can cause images to be output. The output of the images can make the car in multi-view interactive digital media representation 708 appear rotate about axis 704. Whereas, rotations of the mobile device 700 about axis 707 can cause images to be output which make the car in multi-view interactive digital media representation 708 appear to rotate about axis 707. Like the examples described above, navigational inputs, such as rotations of the mobile device about axes 704 or 707, can cause a tilt count to be incremented.

As described above, in one embodiment navigational inputs from an IMU on a device can be used to generate a "tilt count." In particular, the tilt count can be based upon detected changes to a tilt position of the mobile device. The navigational inputs are used to dynamically manipulate a state of a multi-view interactive digital media representation, such as 708. In response to the navigational inputs, multi-view interactive digital media representation states as a function of time can be determined and can be output to a display.

In alternate embodiments, the "tilt count" can be derived from other navigational inputs which are used to dynamically manipulate a multi-view interactive digital media representation as a function of time. For example, display 706 can include a touch sensor and the user may be able to swipe back and forth across the touch screen to manipulate the state of the multi-view interactive digital media representation 708. For example, the swipes can be converted to apparent rotations of the multi-view interactive digital media representation 708 in the clockwise or counter clockwise direction. These navigational inputs can be used to increment a tilt count.

In another embodiment, a slider or some other button can be generated on display 706. A user can touch the slider to move it back and forth on the touch screen and hence cause an object in the multi-view interactive digital media representation 708 to appear to rotate back and forth. Again, these navigational inputs can be converted into values which increment a "tilt" count.

In yet another embodiment, a multi-view interactive digital media representation, such as 708, can be manipulated in response to voice commands. For example, a user might say, "forward" or "backward," to cause the multi-view interactive digital media representation to scroll forward or backward through the sequence of images. The scrolling of the multi-view interactive digital media representation can cause an objects or objects appearing in the multi-view interactive digital media representation to have an apparent motion, such as rotation about an axis. A microphone can receive the voice commands and translate the commands into scrolling of the multi-view interactive digital media representation, such as 708. Again, these navigational inputs can be converted into values which increment a "tilt" count.

In yet a further embodiment, the mobile device 700 can be equipped with gesture recognition. For example, the user may move their hand 705 back and forth in front of camera 709. The movement of the user's hand 705 can be converted to navigational inputs which cause the multi-view interactive digital media representation to scroll backward and forward through the sequence of images. These navigational inputs can be converted into values which increment a "tilt" count.

In an additional embodiment, a multi-view interactive digital media representation, such as 708, can be output to a display where a cursor under the control of the user is output to a display. The cursor can be controlled via device, such as a mouse or a touchpad. The mouse or touchpad can be used to provide navigational inputs which are used to change a state of the multi-view interactive digital media representation output to a display. For example, the cursor can be moved in a first direction to cause the multi-view interactive digital media representation to scroll in a first direction and the cursor can be moved in a second direction to cause the multi-view interactive digital media representation to scroll in a second direction. As another example, the cursor can be used to click on a first location on the screen to scroll the multi-view interactive digital media representation in a first direction and the cursor can be used to click on a second location on the screen to scroll the multi-view interactive digital media representation in a second direction. In yet another example, a scroll wheel on a mouse can be used to scroll through a multi-view interactive digital media representation. These navigational inputs can be converted into values which increment a "tilt" count.

In general, a multi-view interactive digital media representation can be output to a display. An interface can be provided which receives navigational inputs from a user. The navigational inputs can be used to change a state of the multi-view interactive digital media representation, which is output to the display. The change in the state of the multi-view interactive digital media representation as a function of time can cause an object or objects in the multi-view interactive digital media representation to appear to move. The navigational inputs can also be converted into values which are used to increment a "tilt" count. A "tilt" count can be derived from one more sources of navigational input. For example, a tilt count can be derived from navigational inputs received from only an IMU, or from navigational inputs received from an IMU, a touch screen and a mouse.

Figure 8:
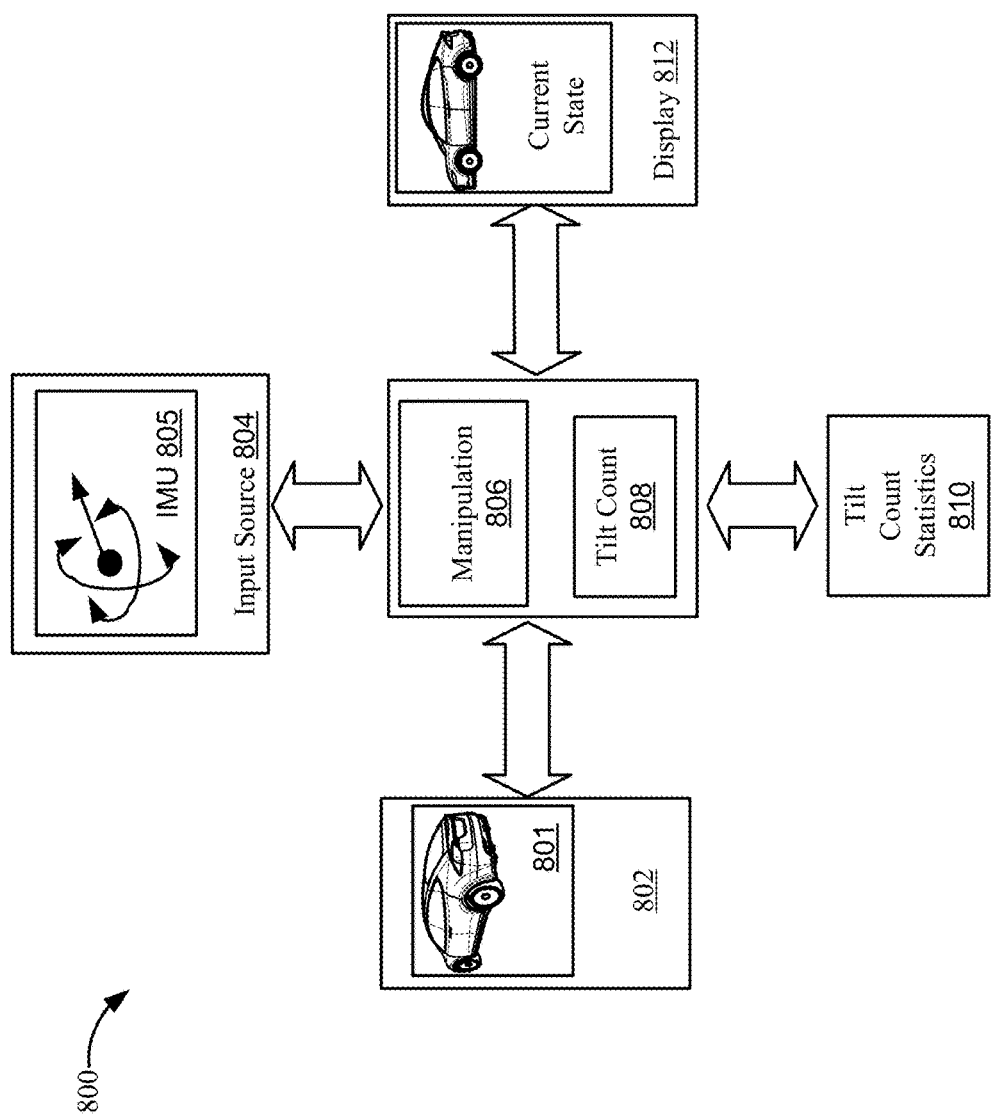
FIG. 8 illustrates a system for acquiring a tilt count for a multi-view interactive digital media representation in accordance with embodiments of the present invention.

FIG. 8 illustrates a system 800 for acquiring a tilt count for a multi-view interactive digital media representation. The system 800 can be implemented on a single device, such as a mobile device or distributed over multiple devices, such as a local device and remote server. The local device can be a smart phone, laptop, tablet or desktop computer and an associated display, such as 812. Typically, navigational inputs can be input via an interface associated with the local device.

In one embodiment, one or more multi-view interactive digital media representations can be generated and stored to a memory 802. One of the multi-view interactive digital media representations, such as 801, can be selected for output to a display device. The multi-view interactive digital media representation can comprise a sequence of images, such as 2-D images received from a camera on a mobile phone. An initial multi-view interactive digital media representation state can be selected for output to the display device 812.

An input source 804 can be used to change the multi-view interactive digital media representation state. In one embodiment, an IMU 805 can be used to generate navigational inputs. The navigational inputs can be used to change a multi-view interactive digital media representation from a first multi-view interactive digital media representation state to a second multi-view interactive digital media representation state.

For instance, sensor data from the IMU 805 can be used to determine a tilt position of a device. The tilt position can be changing as a function of time. Based upon the tilt position, a new multi-view interactive digital media representation state can be generated as a function of the time. The new multi-view interactive digital media representation state can be output to display 812 as a function of time.

The multi-view interactive digital media representation manipulation unit 806 can be configured to determine an initial multi-view interactive digital media representation state to output display 812. The initial multi-view interactive digital media representation state can be an image selected from one of a sequence of images in the multi-view interactive digital media representation. In one embodiment, the initial multi-view interactive digital media representation state can be based upon previous navigational inputs provided by a user or a group of users. For example, if the user or group of users tend to navigate about a particular image in the sequence of images of the multi-view interactive digital media representation, such as scrolling the images in the multi-view interactive digital media representation back and forth over a particular image, then the particular image may be selected as the initial multi-view interactive digital media representation state output to display 812.

Information regarding particular images in the multi-view interactive digital media representation that user's tend to favor can be stored to the tilt count statistics 810. Thus, after the multi-view interactive digital media representation 801 is selected for output to display 812, the multi-view interactive digital media representation manipulation 806 can recall information associated with images in a multi-view interactive digital media representation that are more popular with users from tilt count statistics 810. In another embodiment, information about an initial image in the multi-view interactive digital media representation to output to the display 812 can be stored as meta data associated with the multi-view interactive digital media representation file. Thus, when multi-view interactive digital media representation is loaded for output, the meta data can be read and initial state of the multi-view interactive digital media representation to output to the display can be determined. The meta data regarding the initial image to output can be updated as more information is gathered from the user or the group of users.

The multi-view interactive digital media representation manipulation unit 806 can receive the navigational inputs from the input source 804. Based upon the navigational inputs, the manipulation unit 806 can determine which image from the sequence of images in the multi-view interactive digital media representation to output to display 812 as a function of time. For example, when the initial multi-view interactive digital media representation state includes images preceding it and images following it in the multi-view interactive digital media representation, then, based upon the navigational input, unit 806 can select one or more images preceding the initial state or following the initial state in the multi-view interactive digital media representation to output to the display.

When the initial multi-view interactive digital media representation state is at the beginning or the end of the multi-view interactive digital media representation sequence, then, in one embodiment, only navigational inputs in one direction can cause the multi-view interactive digital media representation state to change. For example, only tilts in one direction can cause the initial multi-view interactive digital media representation state to change. In another embodiment, based upon the navigational input, the multi-view interactive digital media representation can be configured to wrap around from the beginning image in the sequence to the last image in the sequence or vice versa. Thus, when the multi-view interactive digital media representation starts with the beginning image, a navigational input can cause a jump to the last image in the sequence. Then, the navigational input can cause the direction of scrolling to reverse and a jump can occur from the last image to the first image in the sequence of images associated with the multi-view interactive digital media representation.

Based upon the navigational inputs received from the input source 804 and/or changes to the current multi-view interactive digital media representation state determined from unit 806, an increment to a tilt count can be determined by tilt count unit 808. For example, if the user tilts their device through a certain physical angle as determined by IMU sensor data, then unit 808 can generate a tilt count increment. In another example, if each the images in the multi-view interactive digital media representation are associated with an angle and the navigational inputs from input source 804 cause unit 806 to move the multi-view interactive digital media representation through a total angle greater than a threshold amount, then tilt count unit 808 can generate a tilt count increment. In this example, the amount of rotation of the mobile device doesn't necessarily correspond an equal amount of rotation of the object in the multi-view interactive digital media representation. The rotation of the mobile device through a first angle amount can cause a rotation through a second angle amount of an object in the multi-view interactive digital media representation which is greater or less than the first angle amount.

In various embodiments, a multi-view interactive digital media representation may only be output to the display for a threshold number of tilts. When the threshold number of tilts is exceeded, the manipulation unit 806 can cause the multi-view interactive digital media representation to disappear from the display 812. In another embodiment, if the tilt count is not incremented by more than a threshold amount over a time period, then the manipulation unit 806 can cause the multi-view interactive digital media representation to disappear from the display 812.

In yet another embodiment, the tilt count can be used as a trigger to unlock a multi-view interactive digital media representation. For example, when the tilt count associated with multi-view interactive digital media representation 801 is exceeds some threshold amount, then a related multi-view interactive digital media representation can be made available for viewing. The related multi-view interactive digital media representation can replace the initial multi-view interactive digital media representation on display 812. For example, when the tilt count associated with the exterior of car in multi-view interactive digital media representation 801 exceeds a threshold amount, a multi-view interactive digital media representation associated with the interior car can be output to display 812. In another example, when the tilt count associated with the exterior of car in multi-view interactive digital media representation 801 exceeds a threshold amount, a number of multi-view interactive digital media representations associated with other car features or different models of the car can be unlocked and made available for selection by the user.

In a further embodiment, the tilt count can be used as a trigger to unlock additional features of a multi-view interactive digital media representation. For example, the car in multi-view interactive digital media representation 801 can be shown in a first color or first style. When the tilt count associated with the exterior of car in multi-view interactive digital media representation 801 exceeds a threshold amount, the car 801 can be shown on the display 812 in a second color or a series of colors. In another example, when the tilt count associated with the exterior of car in multi-view interactive digital media representation 801 exceeds a threshold amount, the multi-view interactive digital media representation can shift to a stylized version of the car. The car in the multi-view interactive digital media representation is only provided for illustrative purposes only and is not meant to be limiting. The features described herein can be applied to other objects appearing in multi-view interactive digital media representations.

In yet another embodiment, the tilt count can be used as a trigger to unlock additional media components, which may or may not be associated with the multi-view interactive digital media representation. For example, when the tilt count associated with the exterior of car in multi-view interactive digital media representation 801 exceeds a threshold amount, a video and/or audio presentation associated with the car can be output to the display 812. In another example, when the tilt count associated with the exterior of car in multi-view interactive digital media representation 801 exceeds a threshold amount, information about the car, such as performance data, a price, promotional information and/or where to buy the car, can be output to display 812. In yet another example, a video associated with an unrelated product can be output.

As described above, the tilt functions can be applied to multi-view interactive digital media representations with other types of objects. For example, a tilt count associated with multi-view interactive digital media representation of a model wearing clothes for purchase can cause the color of the clothes or the outfit that the model is wearing to change. As another example, a tilt count associated with multi-view interactive digital media representation of a model wearing clothes for purchase can cause the model shown in the multi-view interactive digital media representation to change to a different person. In another example, a tilt count associated with multi-view interactive digital media representation of a model wearing clothes for purchase can cause information regarding a promotion to be output to display 812, such as discount on the clothes from a particular retailer.

Figure 9:
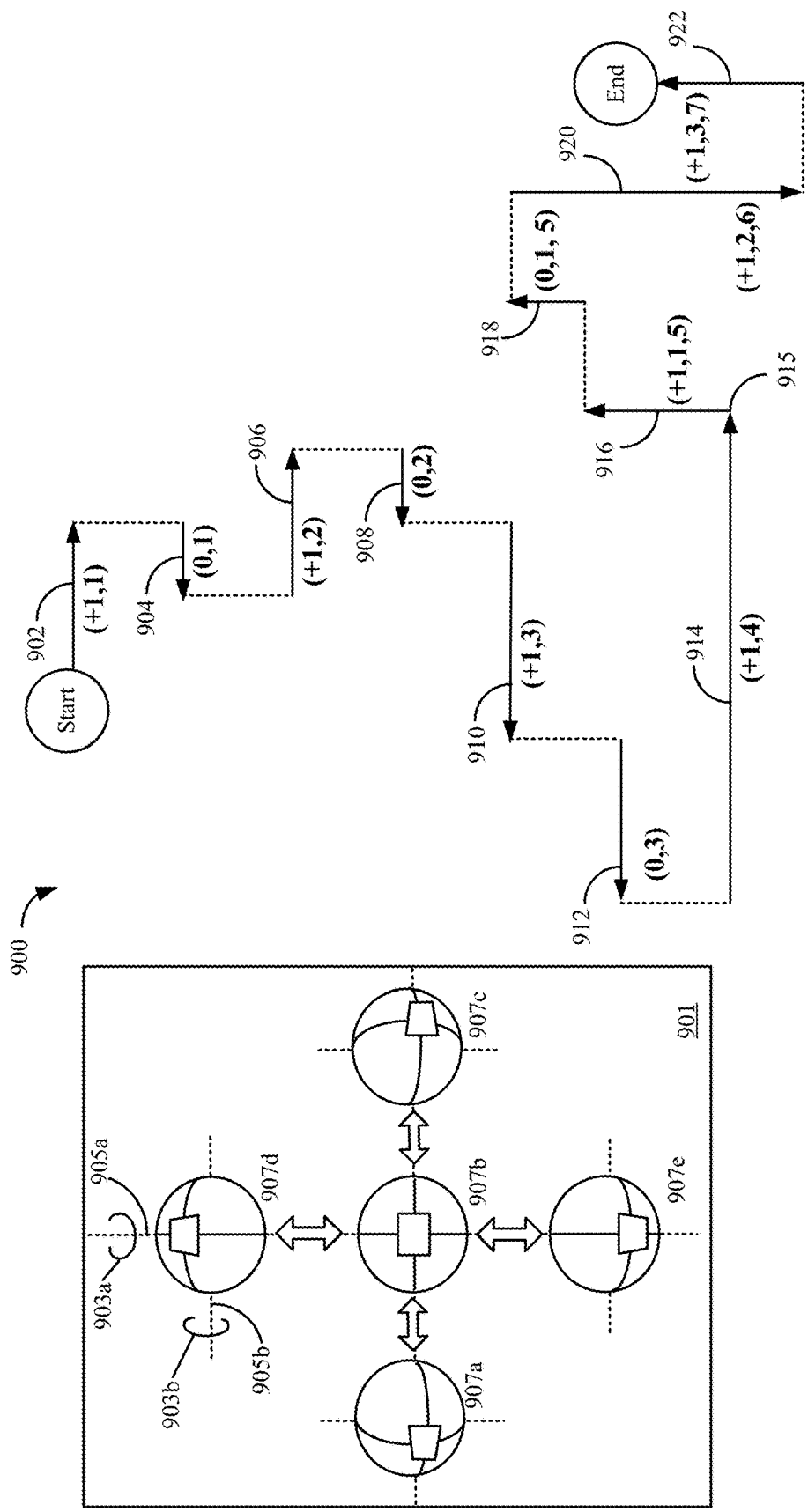
FIG. 9 illustrates an example of incrementing a tilt count in response to navigational inputs in accordance with embodiments of the present invention.

Next, with respect to FIG. 9, additional details of generating a tilt count are described. FIG. 9 illustrates a multi-view interactive digital media representation 901, rotation states of the multi-view interactive digital media representation 901 and a path 900 with increments to a "tilt" count. A multi-view interactive digital media representation 901, which includes a sphere with a square on it, is shown. The multi-view interactive digital media representation 901 can be generated by taking images about axes 905*a* and 905*b*. Thus, when the multi-view interactive digital media representation 901 is manipulated in response to navigational inputs, the sphere and the square can appear to rotate 903*a* about axis 905*a* or can appear to rotate 903*b* about axis 905*b*.

Five multi-view interactive digital media representation states, 907*a*, 907*b*, 907*c*, 907*d* and 907*e*, for multi-view interactive digital media representation 901 are shown. The multi-view interactive digital media representation states 907*a*, 907*b* and 907*c* are associated with rotations 903*a* about axis 905*a*. These multi-view interactive digital media representation states can be generated from images associated with a first camera path. The multi-view interactive digital media representation states 907*d*, 907*b* and 907*e* are associated with rotations 903*b* about axis 905*b*. These multi-view interactive digital media representation states can be generated with images associated with a second camera path.

As described above, the multi-view interactive digital media representation state of multi-view interactive digital media representation 901 can be changed in response to navigational inputs. A first type of navigational input can cause multi-view interactive digital media representation states associated with the first path through image space to be output to a display where the image space includes a plurality of images from which the multi-view interactive digital media representation was generated. A second type of navigational input can cause multi-view interactive digital media representation states associated with the second path through image space to be output to a display.

As an example, a tilt of a mobile device about a first axis can cause the multi-view interactive digital media representation states associated with the first path through image space, such as 907*a*, 907*b* and 907*c*, to be displayed. Whereas, a tilt of the mobile device about a second axis can cause the multi-view interactive digital media representation states associated with the second path through image space, such as 907*b*, 907*d* and 907*e* to be displayed. In one embodiment, the tilt of the mobile device can be determined from sensor data obtained from an IMU within the mobile device.

Since the multi-view interactive digital media representation states are associated with two fixed paths through image space, the transitions from a first path to the second path may not be smooth. For example, a first type of navigational inputs can cause multi-view interactive digital media representation states, 907*a*, 907*b* and 907*c*, to be output, respectively, to the display. Then, a second type of navigational input can cause a transition to the second path. As a result, the multi-view interactive digital media representation state may jump from state 907*c* on the first path to a multi-view interactive digital media representation state, such 907*b*, 907*d* or 907*e*, on the second path. Then, additional multi-view interactive digital media representation states associated with the second path can be output to the display.

In one embodiment, one or more additional paths in image space associated with a multi-view interactive digital media representation of an object, such as the sphere and square, can be unlocked in response to a tilt count. For example, a tilt count can be generated based upon navigational inputs associated with the first path, such as multi-view interactive digital media representation states, 907*a*, 907*b* and 907*c*. At first, it may not be possible to navigate along the second path and output multi-view interactive digital media representation states 907*b*, 907*d* and 907*e*. However, after the tilt count associated with navigation along the first path associated with the multi-view interactive digital media representation 901 exceeds a certain amount, then the multi-view interactive digital media representation states along the second path, such as 907*b*, 907*d* and 907*e*, can be made available for navigation in response to navigational inputs.

In one embodiment, only one path associated with a multi-view interactive digital media representation, such as 901, may be made available for navigation at a time. For example, after the second path is unlocked, as described in the previous paragraph, it may not be possible to navigate along the first path. In another embodiment, it may be possible to navigate along the first path and the second path and jump between paths.

In yet another embodiment, the first path and/or the second may be only made available for a certain number of tilts. After the tilt count along the first path exceeds a threshold amount, then the first path may no longer be available for navigation. After the tilt count along the second path exceeds a threshold amount, then the second path may no longer be available for navigation. Thus, separate tilt counts can be maintained for each of the first path and the second path. The threshold amounts can be the same or different for each path.

Either the tilt count on the first path or the second path can be exceeded first. Thus, based upon the tilt counts for each path, the first path can be available for navigation while the second path is not available for navigation. In addition, the second path can be available for navigation while the first path is not available for navigation. Further, a total tilt count can be maintained for both paths. When the total tilt count exceeds a threshold amount, then the multi-view interactive digital media representation may disappear or may be made no longer for navigation independently of whether the tilt count on either path has been exceeded.

In general, navigation along one or more paths in image space may be available for a multi-view interactive digital media representation. Tilt counts can be used to unlock paths or lock paths. A tilt count on a first path can be used to unlock one or more additional paths. Tilt counts can be maintained separately for a plurality of different paths. Further, a total tilt count can be maintained for navigation along two or more different paths.

The multi-view interactive digital media representation approach differs from rendering the sphere and the square from a full 3-D model. With a full 3-D model approach, the sphere and square can be represented as a series of polygons where the polygons are defined by points in a 3-D model space. After the sphere-square model is initially positioned in the 3-D space, the navigational inputs can be used to adjust the position of the sphere-square in 3-D model space, such as rotating the model.

The re-positioning of the 3-D model involves determining a new location of each of the points of the sphere-square model in the 3-D model space. Next, textures can be reapplied to the sphere-square model. Yet further, a back ground can be added to the 3-D model space. Then, a light source in the 3-D model space can be simulated. Finally, based upon the light source, the 3-D model and the back ground can be re-rendered to a 2-D image. This process is repeated each time the sphere-square model is changed in the 3-D model space.

The determination of the changes to the 3-D model positions in the 3-D space in response to navigational inputs, the re-texturing of the model, the addition of the background and then the re-rendering is computationally expensive, especially as the complexity of the 3-D model increases. Further, as described above, it requires the generation and storage of a 3-D model and its defining parameters, which is time consuming.

The multi-view interactive digital media representation approach doesn't require the determination of the changes to the 3-D model positions in the 3-D space in response to navigational inputs, the re-texturing of the model, the addition of the back ground and light source and the constant rendering of images from a 3-D model space to a 2-D image. The multi-view interactive digital media representation approach doesn't even require the generation of a 3-D model. Thus, the multi-view interactive digital media representation approach can represent apparent motions of an object in 3-D in a faster and more computational efficient manner.

Returning to FIG. 9, a sequence 900 of navigation along two different paths through image space associated with a multi-view interactive digital media representation is described. The image space can be the set of images associated with a multi-view interactive digital media representation. As described above, when the set of images in the image is output to a display, an object in the multi-view interactive digital media representation can appear to move. For example, an object in the multi-view interactive digital media representation can appear to rotate around an axis.

The multi-view interactive digital media representation can be output in a sequence of steps where each step is associated with a sub-set of images in the image space associated with a multi-view interactive digital media representation. For example, path 900 includes steps 902, 904, 906, 908, 910, 912, 914, 916, 918, 920 and 922. At the beginning of each step, a first image in the multi-view interactive digital media representation can be output in the display. Then, one or more additional images from the multi-view interactive digital media representation can be output to the display until a final image in the multi-view interactive digital media representation associated with the step is displayed.

In many instances, the final image in a first step can be the starting image in a following next step along a path, such as 900. For example, the final image in step 902 can be the starting image in step 904. However, in some instances, a jump in the sequence of images can occur between steps. The jump can represent moving from a first group of images in the sequence to a second group of images in the sequence. The jump can cause a discontinuity in the appearance of the object output to a display.

As an example, the sequence of images in a multi-view interactive digital media representation can be grouped according to a plurality of apparent motions of an object. For instance, a first plurality of images in a multi-view interactive digital media representation can be associated with a rotation of an object about a first axis and a second plurality of images in a multi-view interactive digital media representation can be associated with a rotation of the object about a second axis. When the first plurality of images are output in sequence to a display, the object can appear to rotate back and forth about the first axis. When the second plurality of images are output in sequence to the display, the object can appear to rotate back and forth about the second axis. A jump from the first plurality of images to the second plurality images can result from a navigational input, such as 915, in path 900. This jump is also described above with respect to the sphere with the square in 901.

During path 900, a plurality of navigational inputs can be received. The plurality of navigational inputs can be divided into a plurality of portions where one portion is assigned to each step. Each portion can include a beginning navigational input and an ending navigational input. The navigational inputs can be divided into portions according to different events. For example, a mobile device can be at rest, then rotations of the mobile device can be detected, followed by a pause, followed by continued rotations. The navigational inputs associated between the object at rest and the pause can be assigned to a first step where the pause is an event that is used to generate a first portion. The navigational inputs in the first portion can then be used to select a plurality of images associated with the first step to output. Next, the navigational inputs associated with the continued rotations can be divided into one or more additional portions which are assigned to one or more additional steps.

As another example, a mobile device can be at rest and then rotations of the mobile device can be detected including a change in a first direction of rotation of the mobile device to a second direction followed by a change from the second direction back to the first direction. A first portion of navigational inputs between rest and the change from the first direction of rotation to the second direction can be assigned to a first step. A second portion of navigational inputs between the change from the first direction to the second direction and the change from the second direction back to the first direction can be assigned to a second step. Then, the first portion of navigational inputs can be used to determine a first plurality of images to output from a multi-view interactive digital media representation and the second portion of navigational inputs can be used to determine a second plurality of images to output from the multi-view interactive digital media representation.

In the first example, a pause is an event used to divide navigational inputs into a portion which is assigned to a step. In the second example, a change in direction is an event used to divide navigation inputs into a portion which is assigned to a step. Other events associated with the navigational inputs are possible and these examples are provided for the purposes of illustration only. For example, a determination that a swipe of a finger on touchscreen has reached an end of the touchscreen can be an event that is used to divide navigational inputs into portions. In another example, a detection of a change in direction of a rotation of device followed by a rotation above some threshold amount can be an event used to divide navigational inputs into portions.

In one embodiment, after a portion of the navigational inputs is assigned to a step, the navigational inputs in the step can be analyzed to determine whether the tilt count is to be incremented from the step. In one embodiment, the tilt count may not increase unless the portion of navigational inputs results in a motion that is above a threshold. The threshold can be associated with a physical quantity. For example, the length of a swipe across a screen in physical space or the amount of rotation of a device in physical space may have to exceed a certain threshold, such as 1.5 cm or 10 degrees, respectively.

As described above, the portion of navigational inputs associated with a step can be used to select a number of images to display from a surround for the step. In another embodiment, a metric associated with the selected images for a step can be used to determine whether to increment a tilt count. For example, a first metric can be threshold number of images. If more than the threshold number of images is selected for output during a step, then the tilt count can be incremented. In another example, a second metric can be a percentage of the total images in the multi-view interactive digital media representation. Based upon the number of images selected to output during a step, a percentage of the total images in the multi-view interactive digital media representation output during the step can be determined. When the percentage is above a threshold value, then the tilt count can be incremented.

In yet another example, each image can be assigned a value of some type. For example, each image can be associated with an angle of rotation. Then, based upon the images selected for output during a step, a change in the angle of rotation between the beginning image in the step and the ending image in the step can be determined. When the change in the angle of rotation is above a threshold amount, then the tilt count can be incremented.

The change in the angle of rotation determine from the images from the multi-view interactive digital media representation output during a step can be different than a change in the angle of rotation associated with a mobile device as determined from an IMU that was used to select the images. For example, a five degree change in rotation in the mobile device during a step can result in a ten degree change in rotation of an object in a multi-view interactive digital media representation output to a display. As another example, a ten degree change in rotation in the mobile device during a step can result in a five degree change in rotation of an object in a multi-view interactive digital media representation output to a display.

In particular embodiments, after a threshold amount is exceeded for navigation in a particular direction, the user may continue to navigate in the direction for varying amounts. However, the tilt count may only increment one no matter how much navigation occurs in the direction. In another embodiment, how much the user navigates in a particular direction may result in multiple increments to the tilt count. For example, in 914, the length of navigation in direction 914 is much longer than in 902. Hence, the tilt count can be incremented by two instead of one.

In yet other embodiments, a combination of events can be used to determine whether to increment the tilt count. For example, the tilt count can be incremented after the navigation exceeds a threshold amount in a direction. Then, until there is a change in direction, such as a navigational input to cause the direction of movement of the object in the multi-view interactive digital media representation to reverse, then the tilt count may not be incremented. Thus, to increment a tilt count, there needs to be a change in direction and navigation in the changed direction above the threshold amount, i.e., two events need to occur.

For path 900, the tilt count starts at zero. In 902, a navigational input causes a tilt count to increment by one. Hence, the total tilt count after the navigational input associated with 902 is one. In 904, the direction of navigation is changed. However, the amount of navigation in the direction doesn't exceed the threshold amount. Hence, the tilt count is not incremented. In 906, a direction of navigation is changed and the amount of navigation exceeds the threshold amount. Hence, the tilt count is incremented by one and the total tilt count is two.

In 908, a direction change occurs. A navigation of an amount occurs followed by a pause. The amount of navigation doesn't exceed a threshold amount. Hence, the tilt count is not incremented. In 910, the navigation continues in the same direction followed by a pause. The amount of navigation exceeds a threshold amount. Hence, the tilt count is incremented by one and the total tilt count is three.

In 912, the navigation continues in the same direction as 910. The amount of navigation exceeds the threshold amount. However, since a direction change has not occurred, the tilt count is not incremented. In 914, a direction change occurs and the navigation amount exceeds the threshold value. Hence, the tilt count is incremented by one for a total tilt count of four.

In 915, a navigational input is received which causes a jump in from a first path in image space associated with a multi-view interactive digital media representation to a second path in image space associated with a multi-view interactive digital media representation. As described above, the first path can be associated with a first group of images in the multi-view interactive digital media representation which are used to output a first apparent motion of an object and the second path can be associated with a second group of images in the multi-view interactive digital media representation which are used to output a second apparent motion of the object. For example, the user may swipe their finger vertically instead of horizontally on a display to trigger the jump. In 916, the amount of navigation along the second path is enough to increment the tilt count along the second path by one. Thus, the tilt count along the second path is one and the total tilt count along both paths is five.

In 918, after a pause, the user continues to navigate in the same direction as 918. A direction change has not occurred. Further, the amount of navigation has not exceeded a threshold amount. Hence, the tilt count is not incremented.

In 920, a direction change has occurred and the amount of navigation exceeds the threshold amount. Hence, in 920, the tilt count is incremented. The tilt count along the second path is now two and the total tilt count is six. In 922, a direction change occurs. A threshold amount of navigation in the new direction occurs. Hence, the tilt count is incremented by one. Thus, the total tilt count along the second path is three and the total tilt count is seven.

After the navigation associated with the multi-view interactive digital media representation ends, then tilt count statistics can be stored. For example, in 900, tilt counts along each of the first path and the second path can be stored. Further, a total tilt count can be stored. The tilt counts can be associated with the multi-view interactive digital media representation and the user. This accounting is described in more detail as follows with respect to FIG. 10.

In addition, statistics can be kept in regards to the amount each multi-view interactive digital media representation state is viewed. For example, if a user keeps navigating back and forth over a particular multi-view interactive digital media representation state, then the particular multi-view interactive digital media representation state can be output multiple times. This information can be used to select an initial multi-view interactive digital media representation state to output. Further, multi-view interactive digital media representations can be output as selectable thumbnail images. The information associated with how many times a particular multi-view interactive digital media representation state is viewed can be used to select a multi-view interactive digital media representation state to display in the thumbnail image.

Figure 10:
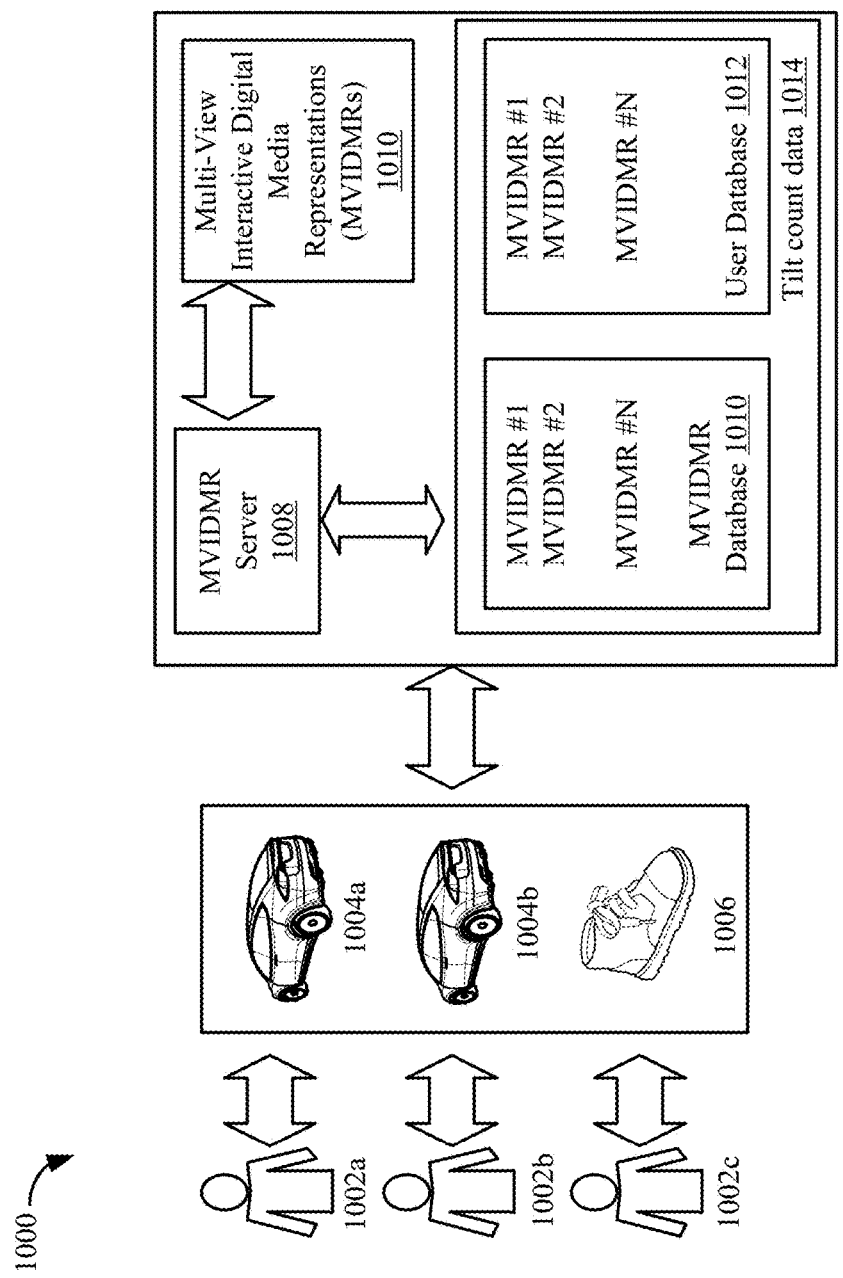
FIG. 10 illustrates a system for serving and displaying multi-view interactive digital media representations using tilt counts in accordance with embodiments of the present invention.

FIG. 10 illustrates a system 1000 for serving and displaying multi-view interactive digital media representations using tilt counts. A multi-view interactive digital media representation server 1010 can have access to a plurality of multi-view interactive digital media representations 1010. The multi-view interactive digital media representation server can receive requests to output multi-view interactive digital media representations, such as a multi-view interactive digital media representation on a web-page. The multi-view interactive digital media representation server 1008 can be configured to select multi-view interactive digital media representations for output including an initial state of the multi-view interactive digital media representation based upon tilt count data 1014.

The tilt count data 1014 can include a multi-view interactive digital media representation database 1010 and a user database 1012. The multi-view interactive digital media representation database can include tilt count statistics for the multi-view interactive digital media representations 1010. For each surround in the multi-view interactive digital media representation database 1010, tilt statistics can be complied from interactions from one or more users.

For example, multi-view interactive digital media representation 1004a and 1004b are the same multi-view interactive digital media representation. The multi-view interactive digital media representations 1004a and 1004b are served to users 1002a and 1002b. The users can 1002a and 1002b can each provide navigational inputs which can cause a tilt count associated with the multi-view interactive digital media representations, 1004a and 1004b, to increment. The tilt counts generated by user 1002a and 1002b can be added to the multi-view interactive digital media representation database associated with the car multi-view interactive digital media representation in 1004a and 1004b. Based upon the user interactions, metrics, such as an average tilt count or a total tilt counts based upon all views, can be generated for the multi-view interactive digital media representation.

The server 1008 can generate metrics, such as an average tilt count or a total tilt count. The metrics can be used to select a multi-view interactive digital media representation 1010 to output to a user. For example, server 1008 can select a first multi-view interactive digital media representation with a higher average tilt count per view, such as 1006, for user 1002c over a second multi-view interactive digital media representation with a lower average tilt count per view. Again, the statistics for multi-view interactive digital media representation 1006 can be stored in the multi-view interactive digital media representation database 1010. Further, the initial multi-view interactive digital media representation state of the first multi-view interactive digital media representation can be based on a count of a number of views of particular images in the multi-view interactive digital media representation from a plurality of users.

The tilt count data 1014 can also include a user database 1012. The user database 1012 can store information on tilt counts for different multi-view interactive digital media representations for different users. For example, the user 1002c may have viewed each of the multi-view interactive digital media representations 1004a and 1006 one or more times. The user database can store how many times the user 1002c has viewed each multi-view interactive digital media representation and the tilt count for each viewing.

The tilt count data 1012 in the user database can be used to select a first multi-view interactive digital media representation from among a plurality of multi-view interactive digital media representations to serve to a user, such as users 1002a, 1002b or 1002c. For example, the user 1002c may have been looking at various multi-view interactive digital media representations, such as multi-view interactive digital media representations of cars and shoes. The tilt count for the user 1002c associated with multi-view interactive digital media representations of shoes may be much greater than the tilt count associated with multi-view interactive digital media representations of cars. Hence, based upon the tilt count, the multi-view interactive digital media representation server can be configured to select a multi-view interactive digital media representation of a shoe 1006 over a multi-view interactive digital media representation of car.

In another embodiment, the tilt count associated with a particular multi-view interactive digital media representation 1002c may be high. The high tilt count can indicate the user looked at it many times. If the tilt count exceeds a certain threshold, the multi-view interactive digital media representation server can be configured to stop showing the multi-view interactive digital media representation with the high tilt count to the user and select another multi-view interactive digital media representation with a lower tilt count.

In another embodiment, the server 1008 can be configured to test out a multi-view interactive digital media representation. This multi-view interactive digital media representation can be referred to as a "test" multi-view interactive digital media representation in that its likeability with users is being tested as measured by a tilt count. Based upon tilt count data in the user database 1012, the server 1008 can be configured to select users to view the test multi-view interactive digital media representation. For example, the server 1008 can select users with an average tilt count per view of a multi-view interactive digital media representation above a threshold amount. Then, after the test multi-view interactive digital media representation is viewed by some amount of users, the server 1010 can look at tilt count data for the test multi-view interactive digital media representation, such as average tilt count per viewing. When the average tilt count per viewing is above a threshold amount the server 1008 can be configured to make the test multi-view interactive digital media representation available for viewing by a larger set of users.

In another embodiment, when the average tilt count per viewing is below a threshold amount the server 1008 can remove the test multi-view interactive digital media representation from the database 1010. Thus, it may no longer be available for viewing. In another embodiment, the server 1008 can be configured to change the initial state of the test multi-view interactive digital media representation. Then, the test multi-view interactive digital media representation can again be presented to users to determine whether the new initial state increases the average tilt count per viewing.

Multi-view interactive digital media representations can be directly sent to users as part of a direct messaging campaign. The multi-view interactive digital media representations can be selected from database 1010. For example, selectable links to the multi-view interactive digital media representations can be sent to users in e-mail messages. The selectable link can include a 2-D image of a 3-D object in the multi-view interactive digital media representation in database 1010. As described above, the 3-D object can be in a preferred orientation in the link, such as an orientation determined from how users view the 3-D object when navigating through a multi-view interactive digital media representations.

After a user selects the selectable link, the multi-view interactive digital media representation can presented. Navigational inputs can be received which affect the presentation of objects in the multi-view interactive digital media representation. Tilt count statistics can be compiled based upon the navigational inputs. In one embodiment, if the tilt count statistics are unfavorable (e.g., below a threshold value) for a particular user, then links to the multi-view interactive digital media representation may no longer be sent to the particular user or served to the particular user. In another embodiment, if the tilt count statistics are unfavorable (e.g., below a threshold value) for a group of users, then links to the multi-view interactive digital media representation may no longer be sent to the any user or served to any user and the multi-view interactive digital media representation may be removed from database 1010.

In system 1000, local devices, which output multi-view interactive digital media representations and receive navigational inputs from users is shown in communication with a remote multi-view interactive digital media representation server 1008. The multi-view interactive digital media representation server 1008 can include processors and memory. In alternate embodiments, functions described with respect to server 1008 can also be implemented on the local device. For example, the local device can include tilt count data 1014 and multi-view interactive digital media representations 1010 and the local device can be configured to select multi-view interactive digital media representations for output based upon the tilt count data. The system 1000 is for illustrative purposes only and is not meant to be limiting.

Figure 11:
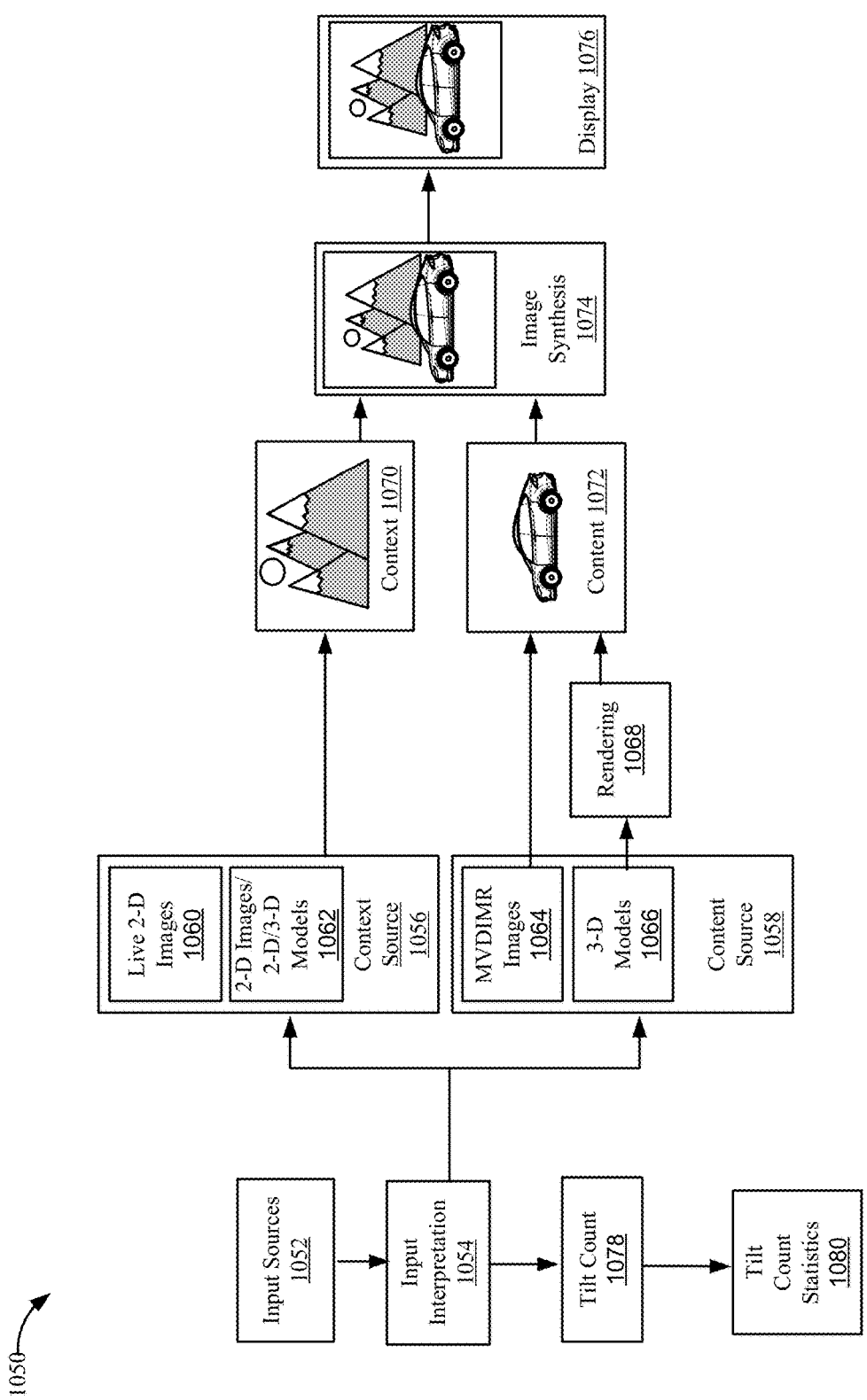
FIG. 11 illustrates a system for generating a sequence of images used to provide a tilt count in accordance with embodiments of the present invention.

FIG. 11 illustrates a system 1050 for generating a sequence of images used to provide a tilt count. The sequence of images can be associated with a multi-media interactive digital media representation (MVIDMR). The system 1050 can be used with the tilt methodologies described above with respect to FIGS. 7-10. In one embodiment, all or a portion of system 1050 can be instantiated on a mobile device including a processor, volatile memory, persistent memory, a touch screen display, microphone, front facing camera, rear facing camera and input buttons.

As described above, the system 1050 can be configured to receive inputs from various input sources 1052. In particular embodiments, inputs can be received from a plurality of input sources simultaneously. For example, the system 1050 can receive live 2-D image data from a front facing camera and live 2-D images from a rear facing camera. The rear facing camera can capture gestures that are interpreted by input interpretation module 1054. The live 2-D image data can be integrated into a MVIDMR presentation.

The outputs from the input interpretation module 1058, such as inputs associated with the gesture recognition, can be used to affect a content source 1058. For example, the outputs from model 1058 can be used to manipulate a 3-D model of an object, such as a car, selected from among the 3-D models 1066. After manipulation, the object associated with the 3-D model can rendered to a 2-D image. The rendered 2-D image can provide content 1072 for the MVIDMR.

As another example, the outputs from the input interpretation module 1058, such as inputs associated with the gesture recognition, can be used to select images to output from a previously generated MVIDMR stored in the MVIDMR images 1064. As described above, when output to a display, such as display 1076, an object in the MVIDMR images can appear to move with some apparent motion, such as a rotation about an axis. The one or more MVIDMR images 1064 can be used to provide content 1072.

In yet another embodiment, the content 1072 can be derived from both MVIDMR images 1064 and the 3-D models. For example, the outputs from the input interpretation module 1058, such as inputs associated with the gesture recognition, can be used to select images to output from a previously generated MVIDMR stored in the MVIDMR images 1064. These images can be combined with images of a 3-D object rendered from one of the 3-D models 1066. The images of the 3-D object can be rendered on the fly whereas the MVIDMR images can be retrieved from memory.

As described above, 2-D live image data can be received from a front facing and rear facing camera simultaneous. The live 2-D images 1060 from the front facing camera can be a context source 1056. One or more live images can be sent to context 1070, such as an image of mountains. Image synthesis 1074 can combine the content 1072 and the context 1070 into a single image. The single image can be output to display 1076.

Besides the live 2-D images 1060, previously generated 2-D images and/or 2-D/3-D models 1062 can be used as a context source 1056. For example, the mountains in context 1070 can be provided from a previously generated image that is stored in persistent memory. In another embodiment, a 2-D or a 3-D model of one or more objects can be used to generate context 1070. For example, the mountains in context 1070 can be generated from a simple 2-D model. In other embodiments, the context can be integrated into the content source 1056, such as MVIDMR images 1064, and context 1070 may not be needed.

As described above, many different input sources can be used to manipulate a content source 1058. For example, sensor data from an IMU can be used to manipulate a 3-D model of an object, which is then rendered to content 1072. For example, tilting a phone about a first axis can cause a 3-D model of an object to rotate about a second axis. Further, tilting the phone about a third axis can cause a 3-D model of the object to rotate about a fourth axis. After the 3-D model is adjusted in 3-D model space, the rendering module 1068 can render a 2-D image of the 3-D model. The 2-D image rendered from the 3-D model can be provided to the content 1072.

In one embodiment, the 3-D model can be restricted to particular motions in response to input, such as the input from the IMU. For example, the 3-D model can be restricted to rotate about a single axis. In another embodiment, the 3-D model can be restricted to rotate about a first axis and a second in response to different inputs. In general, the 3-D model can be configured to move along a particular path in 3-D model space where the path can involve rotations or translations. In another example, the motions of a device including an IMU can be used to make move a 3-D object in similar way as the device. For example, when the device pitches and rolls, the 3-D object can pitch and roll. In this example, the 3-D model may be able to rotate in an unconstrained way but may not be able to translate in the 3-D model space.

In yet other embodiments, a 3-D model may be constrained to only rotate at preselected increments. For example, a 3-D model can be constrained in the 3-D model space to rotate about a first axis in pre-defined 2.5 degrees increments. Thus, in response to navigational inputs, the 3-D model can rotate at increment of 2.5 degrees about an axis. The magnitude of the increments is variable, such as one degree, two degrees or five degree increments, and 2.5 degrees is provided for the purposes of illustration.

In this example, the positions of the points defining the polygons at each angle increment can be pre-calculated and stored to persistent memory. Thus, a coordinate transformation may not have to be applied each time the orientation and/or position of the 3-D model is changed in the 3-D space in which the 3-D model is defined. Based upon predetermined positions of the polygons, new textures can be applied to the polygons and a 2-D image can be rendered for output to display. This approach allows an appearance of a 3-D model to be changed on the fly while requiring less resources than performing a coordinate transformation on the 3-D model.

When the motion of the 3-D model is constrained, less CPU resources can be used when performing a coordinate transformation on the 3-D model. For example, when a model is constrained to rotate about a single axis in 3-D at a time, the transformation can be set up so only new values of two of the three coordinates defining a point in three dimensions need to be determined as a result of an applied rotation. Further, the determination of the new values for the two coordinates can require less computational resources than a general three dimensional coordinate transformation. In addition, the determination of which orientation of an object is most popular for viewing is simpler and can require less CPU resources because the number of object orientations is reduced. In general, when a motion of a 3-D object is constrained, it may be possible to reduce computational resources associated with determining new coordinates of a 3-D model after a movement is applied because the coordinate transformation can be simplified, which reduces needed computations, or some the computations can be performed a priori, which reduces needed computations.

The approach above can be applied to a general 3-D path through 3-D coordinate space. Thus, the locations of the points defining a 3-D model in different orientations and/or positions along a 3-D path can be pre-calculated and stored. The 3-D path can include rotations, such as rotations around one or more different axes, translations and combinations thereof. Navigational inputs can cause different orientations and/or positions of the 3-D model to be rendered in a sequence such that when the rendered images are output to a display, the 3-D model can appear to rotate and/or translate in accordance with the pre-defined orientations and positions. Further, the navigational inputs can cause the 3-D model to move forward or backward in the sequence such that the 3-D model can rotate and/or translate in opposite directions. Different textures can be applied to the 3-D model during the rendering process to change its appearance.

As described above, whether to increment a tilt count can be based upon, a movement of an object in physical space, such as how much a phone is tilted in physical space or a distance traversed across a touch screen by a finger in physical space. In addition, when a 3-D model is used, whether to increment a tilt count can be based upon movement changes in the 3-D model space in which the 3-D model is defined. For example, a navigational input can be used to cause a 3-D model to rotate in 3-D model space. The amount of rotation of the 3-D model in 3-D model space can be used to determine whether to increment a tilt count. In yet other embodiments, whether to increment a tilt count can be based upon movement quantities determined in both physical space and 3-D model space, such as rotation amount in physical space of an object and a rotation amount in 3-D model space.

As describe above, particular orientations of an object may be of more interest to a user than other orientations. In particular embodiments, views of orientations and/or positions of a 3-D model in 3-D model space can be stored. The orientations can be grouped into ranges, such as angle ranges around a particular orientation, can be grouped together. The particular orientations of a 3-D model and ranges can be pre-defined so that they don't overlap.

For example, a 3-D model can be configured to rotate around a single axis at one degree increments between zero and one hundred eighty degrees in response to navigational inputs. The navigational inputs can cause the 3-D model to rotate clockwise or counter-clockwise about the axis. Angle ranges can be defined, such as zero to four degrees, five degrees to nine degrees, etc. Any movements of a 3-D model within an angle range can be counted as viewing the 3-D model at a particular orientation. For example, a first movement which ends at one degree and a second movement that ends at four degrees can be attributed to a single count for the purposes of determining a favored viewing orientation of a 3-D model.

In various embodiments, like the MVIDMR manipulations, a tilt count can be used to unlock access to a particular motion associated with a 3-D object, change a texture or feature associated with the 3-D object, remove the 3-D object from content source 1058 so it is no longer used as content 1072 and unlock a new 3-D object for viewing. Other embodiments described above in the context of the MVIDMR images can be used. Thus, these examples associated with 3-D objects are provided for illustrative purposes only and are not meant to be limiting.

The motions of 3-D model of an object can be used to generate a tilt count 1078. For example, as described above, a tilt count can be incremented when a navigational input causes a 3-D object to move in a first direction by an amount that exceeds a threshold amount. In general, the methods used to determine a tilt count that were described above in the context manipulating MVIDMR images can be applied to motions of a 3-D object which are generated in response to navigational inputs received from the input sources 1052, such as tilt motions determined from an IMU. The tilt count associated with viewing different 3-D objects can be used to generate tilt count statistics 1080 as previous described above.

Figure 12:
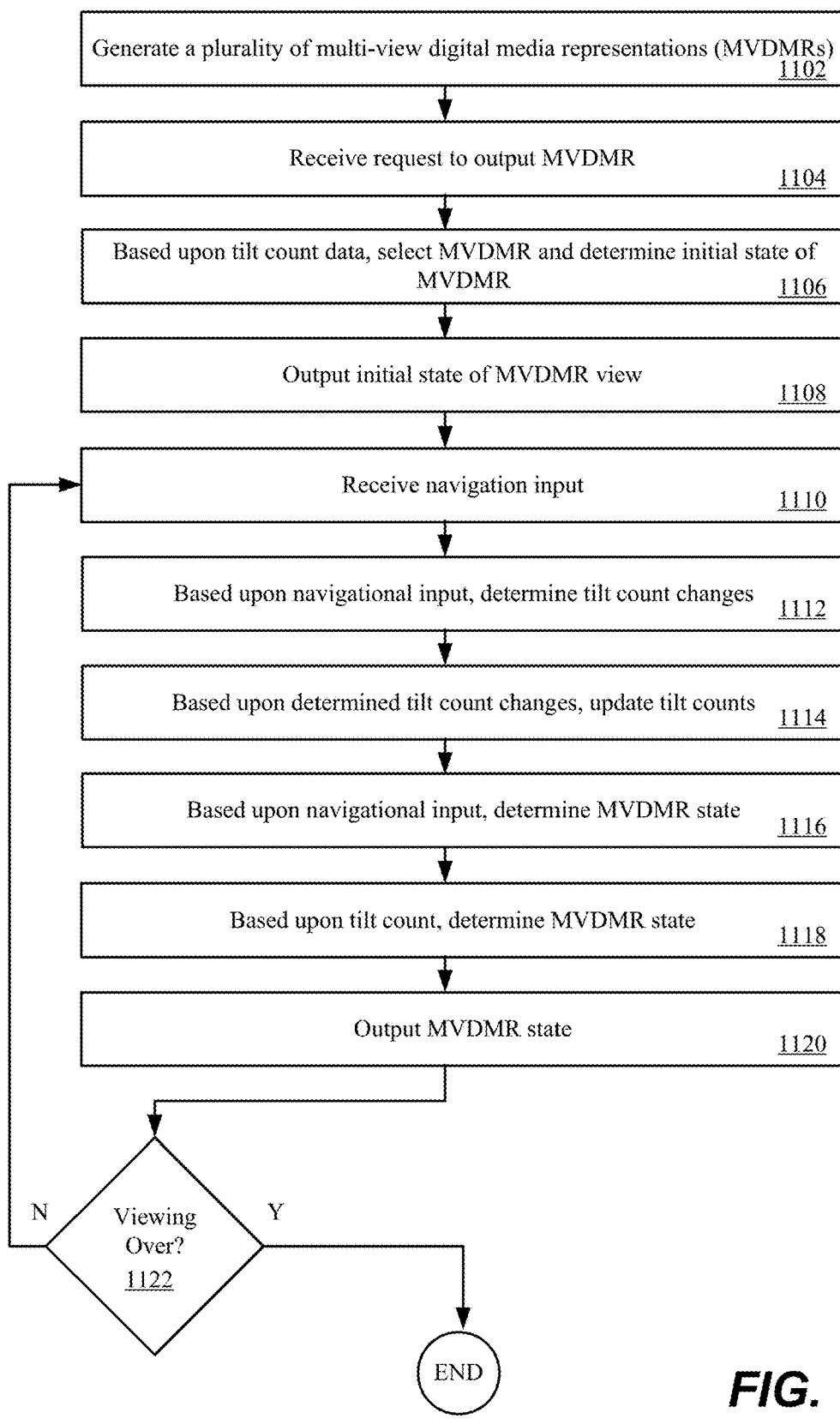
FIG. 12 illustrates an example of a process flow for generating a tilt count in accordance with embodiments of the present invention.

FIG. 12 illustrates an example of a process flow 1100 for generating a tilt count. In 1102, a plurality of multi-view interactive digital media representations can be generated. In 1104, a request to output a multi-view interactive digital media representation can be received.

In 1106, based upon tilt count data, a multi-view interactive digital media representation can be selected from among a plurality of multi-view interactive digital media representations and an initial state of the selected multi-view interactive digital media representation can be determined. The initial state can be an image from a sequence of images in the multi-view interactive digital media representation to output. In an alternate embodiment, a selection of a particular multi-view interactive digital media representation to output can be received and the initial state of particular multi-view interactive digital media representation can be determined.

In 1108, the initial state of the multi-view interactive digital media representation can be output to a display. In 1110, navigational input can be received, such as navigational input based upon sensor data from an IMU on a mobile device. In 1112, based upon navigational input, tilt count changes can be determined. In 1114, based upon the determined tilt count changes, tilt counts can be updated.

In 1116, based upon the navigational input, a new multi-view interactive digital media representation state or a series of multi-view interactive digital media representation states can be determined. The tilt count can affect the multi-view interactive digital media representation state. For example, as described above, after a tilt count is exceeded, an aspect of a multi-view interactive digital media representation can change, such as a color, or a new path in image space can be unlocked. The new path can be a group of images in the image space that when output cause a new apparent motion of the object in the multi-view interactive digital media representation to be displayed. As another example, after a tilt count is exceeded, a multi-view interactive digital media representation may disappear and may no longer be displayed. Thus, in 1118, based upon the tilt count, modifications to the multi-view interactive digital media representation state can be determined. In 1120, based upon the navigational input and the effects of tilt count, a multi-view interactive digital media representation state can be output.

In 1122, the system can determine whether the viewing of the multi-view interactive digital media representation is over. The viewing may end when a user closes the multi-view interactive digital media representation or when navigational input is not received for some time period. When the viewing of the multi-view interactive digital media representation is over, tilt count data can be stored. When the viewing of the multi-view interactive digital media representation is not over, additional navigation input can be received in 1110 and steps 1112, 1114, 1116, 1118 and 1120 can be repeated.

Figure 13:
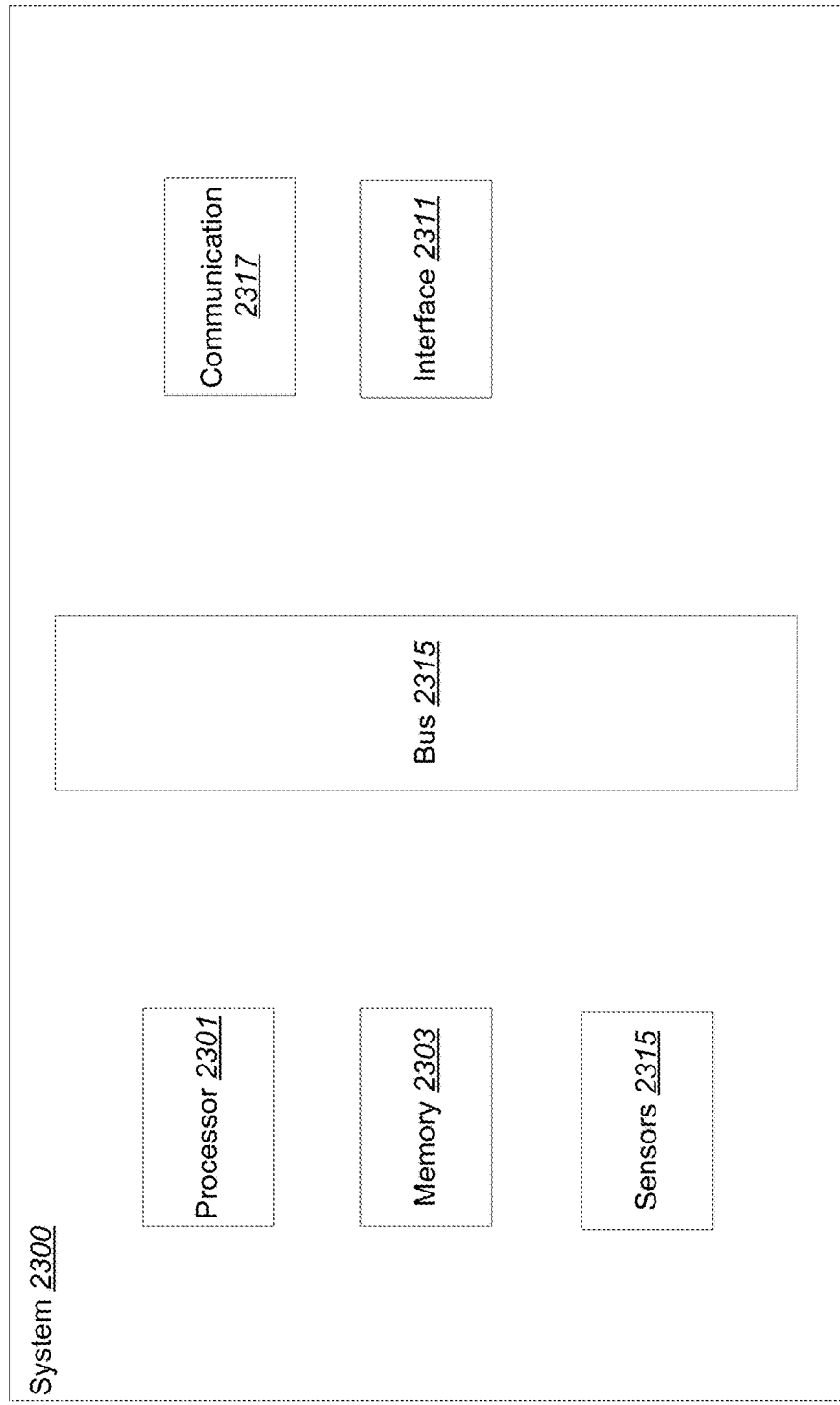
FIG. 13 illustrates a particular example of a computer system that can be used with various embodiments of the present invention.

With reference to FIG. 13, shown is a particular example of a computer system that can be used to implement particular examples of the present invention. For instance, the computer system 2300 can be used to provide multi-view interactive digital media representations according to various embodiments described above. According to particular example embodiments, a system 2300 suitable for implementing particular embodiments of the present invention includes a processor 2301, a memory 2303, an interface 2311, and a bus 2315 (e.g., a PCI bus).

The system 2300 can include one or more sensors, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 2311 may include separate input and output interfaces, or may be a unified interface supporting both operations. Examples of input and output interfaces can include displays, audio devices, cameras, touch screens, buttons and microphones. When acting under the control of appropriate software or firmware, the processor 2301 is responsible for such tasks such as optimization. Various specially configured devices can also be used in place of a processor 2301 or in addition to processor 2301, such as graphical processor units (GPUs). The complete implementation can also be done in custom hardware. The interface 2311 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In FIG. 13, the system 2300 can be integrated into a single device with a common housing. For example, system 2300 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2300 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a multi-view interactive digital media representation. In addition, a virtual guide can be provided to help teach a user how to view a multi-view interactive digital media representation in the wearable system. For example, the virtual guide can be provided in synthetic images output to head mounted display which indicate that the multi-view interactive digital media representation can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    outputting to a display a first 2-D image rendered from a 3-D model of a 3-D object in a 3-D model space wherein points defining the 3-D model are at first 3-D locations in the 3-D model space when the first 2-D image is rendered;
    after the first 2-D image is output to the display, receiving a sequence of navigational inputs from at least one input source wherein the sequence of navigational inputs begins with a first navigational input;
    selecting a second navigational input from among the sequence of navigational inputs;
    based upon at least the second navigational input, determining second 3-D locations of the points defining the 3-D model in the 3-D model space;
    based upon the second 3-D locations, outputting to the display a second 2-D image rendered from the 3-D model in the 3-D model space;
    based upon one of i) a first change between the first navigational input and the second navigational input, ii) a second change between the first 3-D locations and the second 3-D locations or iii) combinations thereof, determining whether to increment a count;
    incrementing the count;
    after the count is incremented, determining the count exceeds a threshold value;
    in response to the count exceeding the threshold value, unlocking a second 3-D model of a second 3-D object;
    determining first 3-D locations of points defining the second 3-D model of the second 3-D object in the 3-D model space; and
    based upon the first 3-D locations of the points defining the second 3-D model, outputting to the display a third 2-D image rendered from the second 3-D model in the 3-D model space.

2. The method of claim 1, wherein the 3-D object appears to rotate about a first axis between from the first 2-D image to the second 2-D image.

3. The method of claim 1, wherein in response to the navigational inputs, the 3-D object is constrained to rotate only about a first axis in the 3-D model space.

4. The method of claim 1, wherein in response to the navigational inputs, the 3-D object is constrained to rotate only about one of a first axis or a second axis in the 3-D model space.

5. The method of claim 1, where movement of the 3-D object is constrained in the 3-D model space.

6. The method of claim 1, further comprising generating a sequence of 3-D locations of the points defining the 3-D model wherein, when the sequence of 3-D locations is rendered as a sequence of 2-D images and output to the display, the 3-D object appears to undergo a movement and storing the locations to a persistent memory.

7. The method of claim 6, wherein the movement is a rotation.

8. The method of claim 6, wherein, based upon the second navigational input, selecting the second 3-D locations from among the sequence of 3-D locations.

9. The method of claim 1, further comprising
    selecting a third navigational input from among the sequence of navigational inputs, the third navigational input received after the second navigational input;
    based upon at least the third navigational input, determining third 3-D locations of the points defining the 3-D model in the 3-D model space;
    based upon the third 3-D locations, outputting to the display a third 2-D image rendered from the 3-D model in the 3-D model space; and
    based upon one of i) a third change between the second navigational input and the third navigational input, ii) a fourth change between the second 3-D locations and the third 3-D locations or iii) combinations thereof, determining whether to increment the count.

10. The method of claim 1, further comprising
    based upon the count, determining a texture to apply to the 3-D model wherein the texture is only applied after the count exceeds a threshold value, applying the texture to the 3-D model at the second locations and rendering the second 2-D image using the texture.

11. The method of claim 1, wherein the second 3-D object is an interior portion of the 3-D object.

12. The method of claim 1, further comprising
    incrementing the count;
    after the count is incremented, determining the count exceeds a threshold value;
    in response to the count exceeding the threshold value, unlocking a movement of the 3-D model of the 3-D object, wherein the 3-D model is only allowed to move with the movement after the movement is unlocked;
    based upon at least a third navigational input, determining third 3-D locations of the points defining the 3-D model in the 3-D model space wherein the third 3-D locations are associated with the unlocked movement;
    based upon the third 3-D locations, outputting to the display a third 2-D image rendered from the 3-D model in the 3-D model space; and
    based upon one of i) a third change between the second navigational input and the third navigational input, ii) a fourth change between the second 3-D locations and the third 3-D locations or iii) combinations thereof, determining whether to increment the count.

13. The method of claim 12 wherein the movement includes a rotation of the 3-D object about an axis.

14. The method of claim 1, further comprising determining the count is less than a threshold value;
    in response to the count not exceeding the threshold value, locking the 3-D model of the 3-D object so that it is no longer viewable on the display.

15. The method of claim 1, further comprising: based upon the second navigational input, determining a change in a direction of movement of the 3-D object and based upon the change in the direction of the movement of the 3-D object, determining whether to increment the count.

16. The method of claim 15, wherein the change is the direction of movement is a change in a direction of rotation of the 3-D object.

17. The method of claim 1, wherein the at least one input source is an inertial measurement unit on a device and wherein the first change is a change in an angle of the device determined from inertial measurement unit sensor data.

18. The method of claim 1, wherein the 3-D object rotates about an axis from the first 3-D locations to the second 3-D locations and wherein the second change is amount of rotation about the axis.

19. The method of claim 1, wherein the 3-D model is a model of a person.

20. The method of claim 1, wherein the at least one input source is an inertial measurement unit.

21. The method of claim 1, wherein the sequence of navigational inputs is from a plurality of input sources.

22. A method comprising:
outputting to a display a first 2-D image rendered from a 3-D model of a 3-D object in a 3-D model space wherein points defining the 3-D model are at first 3-D locations in the 3-D model space when the first 2-D image is rendered;
after the first 2-D image is output to the display, receiving a sequence of navigational inputs from at least one input source wherein the sequence of navigational inputs begins with a first navigational input;
selecting a second navigational input from among the sequence of navigational inputs;
based upon at least the second navigational input, determining second 3-D locations of the points defining the 3-D model in the 3-D model space;
based upon the second 3-D locations, outputting to the display a second 2-D image rendered from the 3-D model in the 3-D model space;
based upon one of i) a first change between the first navigational input and the second navigational input, ii) a second change between the first 3-D locations and the second 3-D locations or iii) combinations thereof, determining whether to increment a count; and
based upon the count, determining a texture to apply to the 3-D model wherein the texture is only applied after the count exceeds a threshold value, applying the texture to the 3-D model at the second 3-D locations and rendering the second 2-D image using the texture.

23. A method comprising:
outputting to a display a first 2-D image rendered from a 3-D model of a 3-D object in a 3-D model space wherein points defining the 3-D model are at first 3-D locations in the 3-D model space when the first 2-D image is rendered;
after the first 2-D image is output to the display, receiving a sequence of navigational inputs from at least one input source wherein the sequence of navigational inputs begins with a first navigational input;
selecting a second navigational input from among the sequence of navigational inputs;
based upon at least the second navigational input, determining second 3-D locations of the points defining the 3-D model in the 3-D model space;
based upon the second 3-D locations, outputting to the display a second 2-D image rendered from the 3-D model in the 3-D model space;
based upon one of i) a first change between the first navigational input and the second navigational input, ii) a second change between the first 3-D locations and the second 3-D locations or iii) combinations thereof, determining whether to increment a count;
incrementing the count;
after the count is incremented, determining the count exceeds a threshold value;
in response to the count exceeding the threshold value, unlocking a movement of the 3-D model of the 3-D object, wherein the 3-D model is only allowed to move with the movement after the movement is unlocked;
based upon at least a third navigational input, determining third 3-D locations of the points defining the 3-D model in the 3-D model space wherein the third 3-D locations are associated with the unlocked movement;
based upon the third 3-D locations, outputting to the display a third 2-D image rendered from the 3-D model in the 3-D model space; and
based upon one of i) a third change between the second navigational input and the third navigational input, ii) a fourth change between the second 3-D locations and the third 3-D locations or iii) combinations thereof, determining whether to increment the count.

* * * * *